(12) United States Patent
Bullard et al.

(10) Patent No.: US 11,982,110 B2
(45) Date of Patent: *May 14, 2024

(54) SYSTEMS AND METHODS FOR FACILITATING LOGISTICS

(71) Applicant: Stress Engineering Services, Inc., Mason, OH (US)

(72) Inventors: Joseph Krumme Bullard, West Chester, OH (US); Clinton A. Haynes, Mason, OH (US); Shannon R. Read, Lebanon, OH (US); Micah Timothy Boswell, Mason, OH (US); Alicia Marie Evans, Loveland, OH (US)

(73) Assignee: Stress Engineering Services, Inc., Mason, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/237,558

(22) Filed: Aug. 24, 2023

(65) Prior Publication Data

US 2023/0392416 A1    Dec. 7, 2023

Related U.S. Application Data

(63) Continuation of application No. 18/109,319, filed on Feb. 14, 2023, now Pat. No. 11,773,626.

(Continued)

(51) Int. Cl.
*E05B 67/00* (2006.01)
*E05B 73/00* (2006.01)
(Continued)

(52) U.S. Cl.
CPC ........ *E05B 67/003* (2013.01); *E05B 73/0005* (2013.01); *E05B 83/02* (2013.01); *G08B 21/18* (2013.01)

(58) Field of Classification Search
CPC .............. E05B 67/003; E05B 73/0005; E05B 73/0017; E05B 73/0029; E05B 83/02; G08B 21/18
See application file for complete search history.

(56) References Cited

U.S. PATENT DOCUMENTS

| 5,610,587 A | * | 3/1997 | Fujiuchi | G08B 13/1463 70/57.1 |
| 7,239,238 B2 | | 7/2007 | Tester et al. | |

(Continued)

FOREIGN PATENT DOCUMENTS

| BE | 1022103 B1 | 2/2016 |
| CA | 2622585 C | 1/2011 |

(Continued)

*Primary Examiner* — Christopher J Boswell
(74) *Attorney, Agent, or Firm* — Frost Brown Todd LLP

(57) ABSTRACT

A seal assembly for a container includes a locking assembly and a gateway. The locking assembly includes a body and an elongated cable. The elongated cable extends from a proximal end to a distal end. The proximal end is restrained by the body. The distal end is movable from an unlocked position spaced from the body to a locked position restrained by the body. The gateway is configured for selectively interlocking with the locking assembly. The gateway includes a power supply, a radio communication device, a sensor, and a processor electrically coupled therewith. The processor is configured to operate the radio communication device to transmit a first signal upon detection by the sensor of interlocking of the gateway with the locking assembly, and to transmit a second signal upon detection by the sensor that the elongated cable has been cut. Locking assemblies, gateways, devices and methods are also provided.

19 Claims, 14 Drawing Sheets

Related U.S. Application Data

(60) Provisional application No. 63/401,814, filed on Aug. 29, 2022, provisional application No. 63/310,287, filed on Feb. 15, 2022.

(51) Int. Cl.
  *E05B 83/02* (2014.01)
  *G08B 21/18* (2006.01)

(56) References Cited

U.S. PATENT DOCUMENTS

| | | | | |
|---|---|---|---|---|
| 7,453,370 | B2 * | 11/2008 | Marsilio | E05B 73/0017 340/568.1 |
| 8,044,806 | B2 * | 10/2011 | Sayegh | E05B 73/0017 292/307 R |
| 8,228,192 | B2 * | 7/2012 | Eckert | E05B 73/0017 340/568.4 |
| 8,963,712 | B2 | 2/2015 | Mullis et al. | |
| 9,121,195 | B2 * | 9/2015 | Mullis | E05B 73/0017 |
| 9,177,491 | B2 * | 11/2015 | Azzalin | G09F 3/0358 |
| 9,677,300 | B2 | 6/2017 | Mullis et al. | |
| 9,697,711 | B2 | 7/2017 | McIntosh | |
| 9,704,092 | B2 | 7/2017 | Held | |
| 9,745,782 | B2 * | 8/2017 | Mubarak | G09F 3/0335 |
| 10,417,890 | B2 | 9/2019 | Schomacker | |
| 10,497,289 | B2 | 12/2019 | Debrody et al. | |
| 10,510,272 | B1 | 12/2019 | Chen | |
| 11,386,814 | B2 * | 7/2022 | Sundholm | G09F 3/208 |
| 11,403,928 | B2 * | 8/2022 | Miettinen | E05B 73/0017 |
| 11,566,445 | B2 | 1/2023 | Strang | |
| 11,620,890 | B2 | 4/2023 | Haynes et al. | |
| 11,773,626 | B2 * | 10/2023 | Bullard | E05B 73/0005 70/51 |
| 11,776,370 | B2 | 10/2023 | Haynes et al. | |
| 2005/0231365 | A1 * | 10/2005 | Tester | G09F 3/0347 292/307 R |
| 2008/0068173 | A1 | 3/2008 | Alexis et al. | |
| 2010/0141455 | A1 * | 6/2010 | Stefanelli | E05B 73/0017 340/572.8 |
| 2016/0335864 | A1 * | 11/2016 | Sayegh | E05B 73/0017 |
| 2023/0087846 | A1 | 3/2023 | Cotte | |

FOREIGN PATENT DOCUMENTS

| | | |
|---|---|---|
| CN | 206471064 U | 9/2017 |
| CN | 209149693 U | 7/2019 |
| EP | 3364333 B1 | 4/2022 |
| IT | 20140006 U1 | 1/2016 |
| WO | 2021044337 A1 | 3/2021 |
| WO | 2023158624 A2 | 8/2023 |

\* cited by examiner

SYSTEMS AND METHODS FOR FACILITATING LOGISTICS

REFERENCE TO RELATED APPLICATIONS

This application is a continuation of U.S. non-provisional patent application Ser. No. 18/109,319 filed Feb. 14, 2023, entitled "Systems and Methods for Facilitating Logistics," which claims priority of U.S. provisional patent application Ser. No. 63/310,287 filed Feb. 15, 2022, entitled "Systems and Methods for Facilitating Logistics," and U.S. provisional patent application Ser. No. 63/401,814 filed Aug. 29, 2022, entitled "Systems and Methods for Facilitating Logistics," and hereby incorporates each of these patent applications by reference herein in their respective entireties.

TECHNICAL FIELD

The system and methods described herein facilitate effective logistics involving the shipment of cargo.

BACKGROUND

Conventional systems and methods for facilitating and tracking the shipment of cargo leave for damage, loss and theft, thereby resulting in dissatisfaction, inefficiency, inconvenience, and excess cost.

SUMMARY

In accordance with one embodiment, a seal assembly is provided for a container. The seal assembly comprises a locking assembly and a gateway. The locking assembly comprises a body and an elongated cable. The elongated cable extends from a proximal end to a distal end. The proximal end is restrained by the body. The distal end is movable from an unlocked position to a locked position. In the unlocked position, the distal end is spaced from the body. In the locked position, the distal end is restrained by the body. The gateway is configured for selectively interlocking with the locking assembly. The gateway comprises a power supply, a radio communication device, a sensor, and a processor electrically coupled with each of the power supply, the radio communication device, and the sensor. The processor is configured to operate the radio communication device to transmit a first signal upon detection by the sensor of interlocking of the gateway with the locking assembly. The processor is further configured to operate the radio communication device to transmit a second signal upon detection by the sensor that the elongated cable has been cut.

In accordance with another embodiment, a seal assembly is provided for a container. The seal assembly comprises a locking assembly and a gateway. The locking assembly comprising means for locking a hasp. The gateway is configured for selectively interlocking with the locking assembly. The gateway comprises sensor means. The gateway further comprises means for wirelessly transmitting a first signal upon detection by the sensor means of interlocking of the gateway with the locking assembly. The gateway also comprises means for wirelessly transmitting a second signal upon detection by the sensor means of unlocking of the locking means.

In accordance with yet another embodiment, a locking assembly comprises an elongated cable, a body, a proximal end ferrule, a distal end ferrule, and a spring. The elongated cable comprises a core and a cover. The cover coaxially surrounds the core. The elongated cable extends from a proximal end to a distal end. The body defines a proximal passage and a distal passage. The proximal end ferrule is attached to the core adjacent to the proximal end. The distal end ferrule is attached to the core adjacent to the distal end. The spring abuts the body adjacent to the proximal passage. A portion of the core adjacent to the proximal end extends sequentially through the proximal passage, through the spring and into the proximal end ferrule.

In accordance with still another embodiment, a method is provided of managing logistics for a container containing cargo. The method comprises facilitating sealing of the container with a seal assembly. The method further comprises facilitating transportation of the container by a vessel operated by a transporting agent along a route. The method also comprises receiving, by a quality control supervisor, a signal from the seal assembly. The signal reflects that an environmental condition is undesirable for the cargo. The method also comprises, in response to receipt of the signal by the quality control supervisor, requesting the transporting agent to modify a characteristic of the transportation of the container.

In accordance with still another embodiment, a method is provided of managing logistics for a container containing cargo. The method comprises facilitating sealing of the container with a seal assembly. The seal assembly is configured to identify a geographic location of the container. The method also comprises facilitating transportation of the container by a vessel operated by a transporting agent along a route. The method additionally comprises receiving, by a quality control supervisor, a signal from the seal assembly. The signal relates to the geographic location. The method also comprises predicting, by the quality control supervisor, that the route is undesirable due to a condition. The method also comprises requesting, by the quality control supervisor and in response to the predicting, the transporting agent to modify a characteristic of the transportation of the container.

In accordance with yet another embodiment, a gateway comprises a power supply, a radio communication device, a first magnetic detector, a second magnetic detector, an outer housing defining an exterior channel, and a processor. The processor is electrically coupled with each of the power supply, the radio communication device, the first magnetic detector and the second magnetic detector. The processor is configured to operate the radio communication device to transmit a first signal upon determination, by the processor, and based upon signals from the first magnetic detector and the second magnetic detector, if a locking assembly is intact and interlocked within the exterior channel.

In accordance with another embodiment, a device comprises an outer housing, a power supply, a radio communication device, a first thermal sensor, a first conductor, a second conductor, and a controller. The first conductor is coupled with the first thermal sensor and extends through the outer housing. The second thermal sensor is spaced from the first thermal sensor. The second conductor is coupled with the second thermal sensor and extends through the outer housing. The controller is disposed within the outer housing. Each of the power supply, the radio communication device, the first thermal sensor, and the second thermal sensor are electrically coupled with the controller and disposed within the outer housing.

BRIEF DESCRIPTION OF THE DRAWINGS

It is believed that certain embodiments will be better understood from the following description taken in conjunction with the accompanying drawings in which.

DETAILED DESCRIPTION

Figure 1:
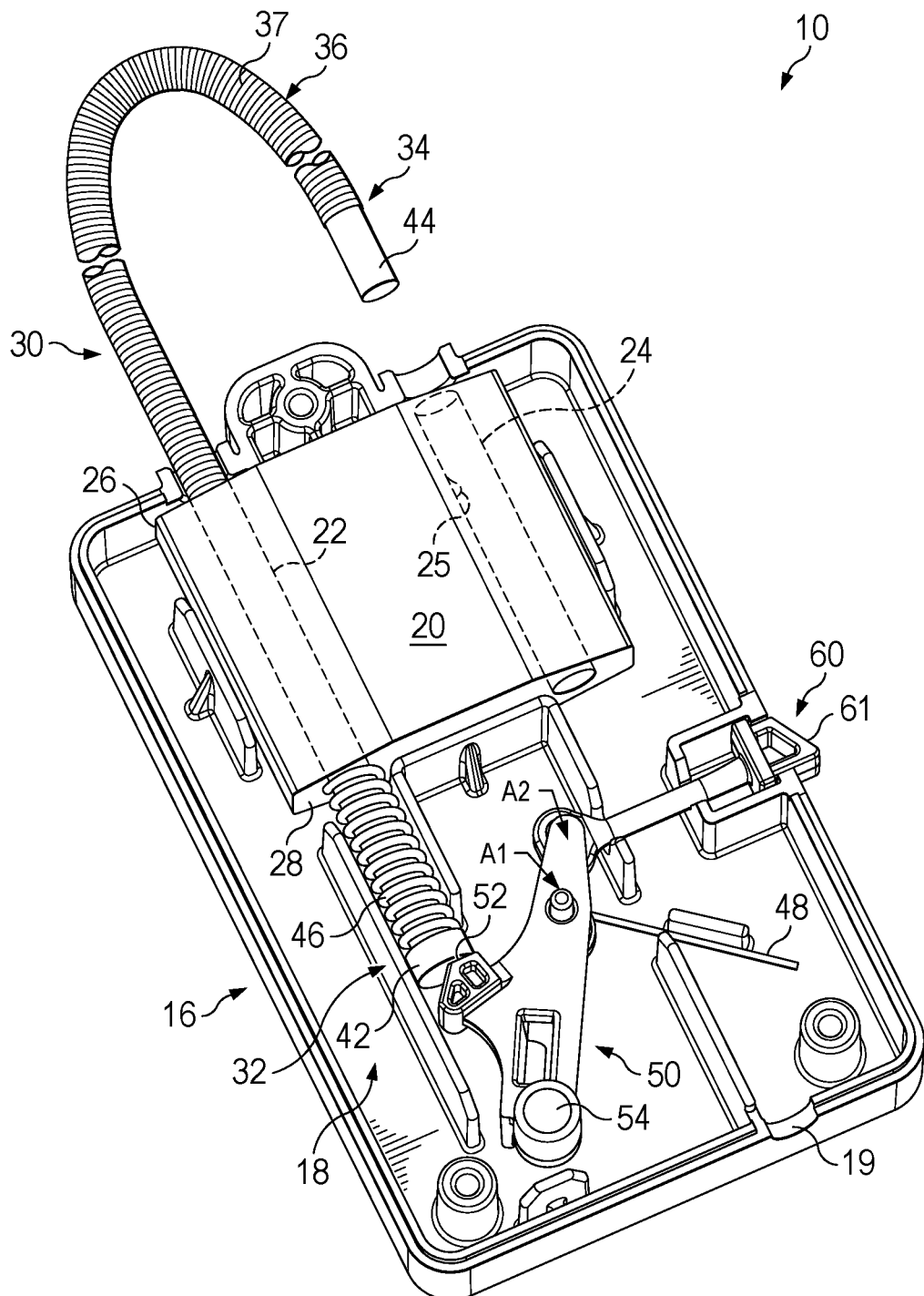
FIG. 1 is a perspective view depicting a locking assembly in accordance with one embodiment, wherein an upper shell has been removed for clarity of illustration, and wherein a distal end of an intact elongated cable is in an unlocked position.

Systems and methods for facilitating logistics are described in connection with the views and examples of FIGS. 1-14, wherein like numbers indicate the same or corresponding elements throughout the views. A seal assembly as described herein can be temporarily or permanently attached to a trailer, truck, railcar, transport vehicle or other container (herein collectively referred to as a container, for ease of reference) when shipping high value goods, sensitive goods, or goods of any kind (herein collectively referred to as cargo, for ease of reference). In accordance with one embodiment, a seal assembly is herein described such as for use with a container, and can be formed through combination of a locking assembly and a gateway, wherein the gateway can be configured for selectively interlocking with the locking assembly as will be described below. In one embodiment, the locking assembly can be configured as a disposable component, namely for one-time use, while the gateway is configured for repeatable use with a succession of respective locking assemblies.

An example of a suitable locking assembly 10 will now be described with reference to FIGS. 1-4. The locking assembly 10 is shown to include a carrier 12 that can be formed by mating an upper shell 14 with a lower shell 16 to define an internal compartment 18. In one embodiment, the carrier 12 can be formed from plastic, with the upper and lower shells 14 and 16 being attached together with one or more of adhesive, fasteners, radio frequency welding, gaskets and interlocking mechanical features. It will be appreciated that, in other embodiments, the carrier can be formed from any of a variety of other suitable materials. In still other embodiments, a locking assembly might not include a carrier.

The locking assembly 10 is also shown to include a body 20 disposed within the internal compartment 18. The body 20 can define a proximal passage 22 and a distal passage 24 which can be spaced and parallel with one another as shown, for example, in FIG. 1. In one embodiment, the body 20 can be formed from metal, though it will be appreciated that, in other embodiments the body can be formed from any of a variety of other suitable materials.

The locking assembly 10 can additionally include an elongated cable 30. The elongated cable 30 is shown to comprise a Bowden-type cable having a core 38 (see FIG. 3) and a cover 36, with the cover 36 coaxially surrounding the core 38, as shown in the example of FIGS. 1-4. The elongated cable 30 can extend from a proximal end 32 to a distal end 34. In one embodiment, each of the cover 36 and the core 38 can be formed from steel, though it will be appreciated that any of a variety of other suitable materials can otherwise be used. In one example, the core 38 can be formed of a wire rope or aircraft type cable.

To manufacture the locking assembly 10, the elongated cable 30 can be attached to the body 20. More particularly, referring to the example of FIGS. 1-4, a portion of the core 38 adjacent to the proximal end 32 of the elongated cable 30 can be routed sequentially through the proximal passage 22 of the body 20, through a spring 46, and into a proximal end ferrule 42 which can be crimped or otherwise attached to the core 38 adjacent to the proximal end 32 of the elongated cable 30. A distal end ferrule 44 can be crimped or otherwise attached to the core 38 adjacent to the distal end 34 of the elongated cable 30. In an alternative embodiment, the cover 36 can, together with the core 38, be captured within the distal end ferrule 44 (e.g., by crimping) adjacent to the distal end 34 of the elongated cable 30.

In the process of assembling the elongated cable 30 to the body 20 in this manner, and with the elongated cable 30 being intact, it will be appreciated that the spring 46 can be compressed between the proximal end ferrule 42 and the body 20, thus simultaneously maintaining tension on the core 38 and compression on the cover 36, with each opposing one another along a longitudinal length of the elongated cable 30. In this configuration, it can be seen with reference to FIG. 1, for example, that the proximal end ferrule 42 can abut one end of the spring 46, with the other end of the spring 46 abutting an inner surface 28 of the body 20 at a location adjacent to an end of the proximal passage 22. The cover 36 adjacent to the proximal end 32 of the elongated cable 30 can abut an outer surface 26 of the body 20 at a location adjacent to an opposing end of the proximal passage 22. Thus it will be appreciated that the proximal passage 22 can have a dimension large enough to pass the core 38 but not the cover 36 or the spring 46, such that the core 38 can slide freely within the proximal passage 22, but such that each of the spring 46 and the cover 36 abuts the body 20 and can be prevented from entering the proximal passage 22.

The distal end ferrule 44 can abut the cover 36 adjacent to the distal end 34 of the elongated cable 30, as also shown in FIG. 1. In an unlocked configuration as shown for example in FIG. 1, it will be appreciated that the proximal end 32 of the elongated cable 30 can be restrained by the body 20, with the distal end 34 of the elongated cable 30 being unattached to the body 20 and free to move from an unlocked position (e.g., FIG. 1) in which the distal end 34 is spaced from the body 20 to a locked position (e.g., FIG. 5) in which the distal end 34 is restrained by the body as discussed further below.

With the elongated cable 30 secured to the body 20, the body 20 can be inserted into the internal compartment 18 such that the body 20 is sandwiched between the upper and lower shells 14 and 16 or otherwise restrained by the carrier 12. In this configuration and with the carrier 12 fully assembled, the proximal end 32 of the elongated cable 30 can be at least partially disposed within the internal compartment 18, but with another portion of the elongated cable 30 extending through an opening 15 (FIG. 4) in the carrier 12 and outside of the internal compartment 18.

Figure 2:
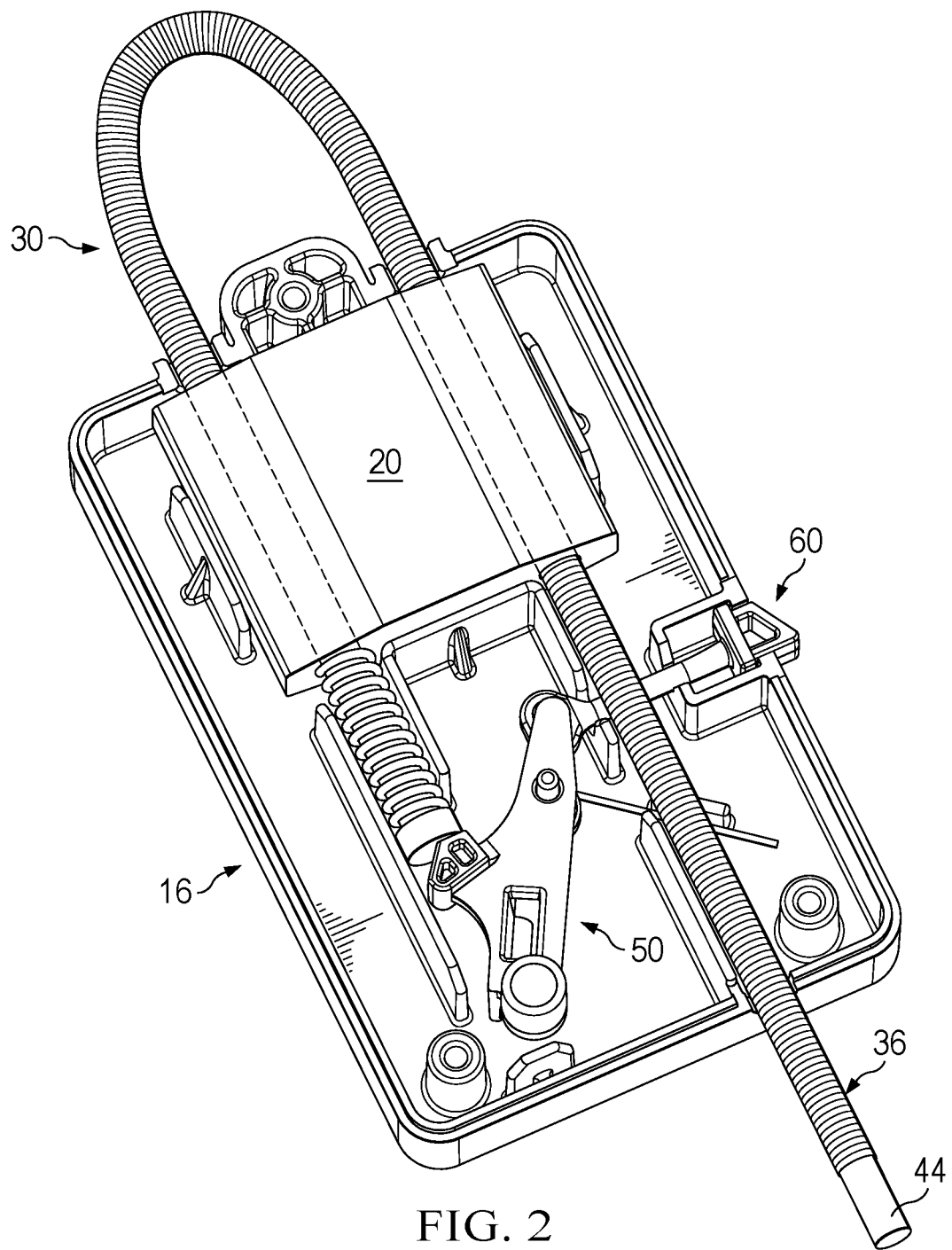
FIG. 2 is a perspective view depicting the arrangement of FIG. 1, but with the distal end being in a locked position, in accordance with one embodiment.
Figure 3:
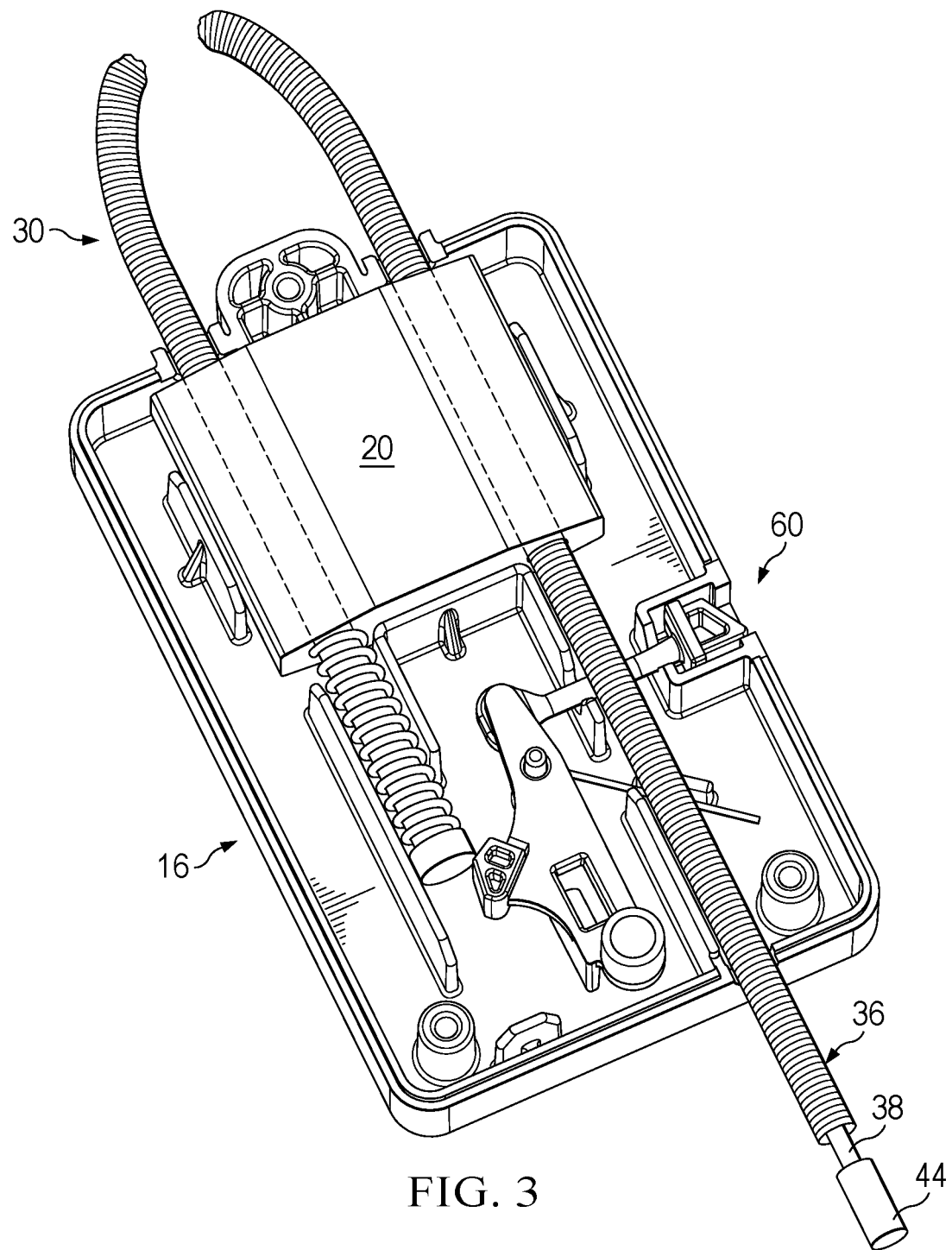
FIG. 3 is a perspective view depicting the arrangement of FIG. 2, but with the elongated cable having been severed or cut, in accordance with one embodiment.

Referring to FIG. 1, the locking assembly 10 can further include a spring 48, a cam and a striker 60. The spring 48 and the cam 50 can each be disposed within the internal compartment 18 defined by the carrier 12. The cam 50 can include an engagement face 52 that contacts the proximal end ferrule 42. The cam 50 is also shown to include a magnet 54 that is configured to produce a magnetic field. The cam 50 can be configured to move, such as by pivoting about an axis A1 as shown in FIG. 1. The spring 48 can bias the cam 50 toward the first position, as shown in FIGS. 1-2. The striker 60 can be movably coupled with the cam 50, such as at a pivot joint associated with an axis A2 in FIG. 1. In this configuration, movement of the cam can result in movement of the striker 60 between an extended position (FIG. 1) and a retracted position (FIG. 3). In one embodiment, as shown in FIG. 1, axis A1 can be parallel with axis A2.

The distal end 34 of the elongated cable 30 can be inserted through an opening 17 (FIG. 4) in the carrier 12 and into the distal passage 24 of the body 20 to facilitate locking of the locking assembly 10. Depending how much length of the elongated cable 30 is used to interface a hasp or other structure to facilitate locking of a container (see FIG. 6), more or less of the elongated cable 30 can be inserted into and through the distal passage 24 of the body 20. In some circumstances, sufficient length of the elongated cable 30 can be inserted through the distal passage 24 such that the distal end 34 of the elongated cable 30 extends through a bottom opening (e.g., defined in part by recess 19 of the lower shell 16 as shown in FIG. 1), as will be appreciated with reference to FIG. 5. It will be appreciated that each of the openings 15 and 17 and the bottom opening can accordingly have a dimension larger than that of each of the distal end ferrule 44 and an outer diameter of the cover 36 of the elongated cable 30.

In one embodiment, the cover 36 of the elongated cable 30 has a ribbed or otherwise textured outer surface 37. The distal passage 24 of the body 20 can be provided with a ratcheting or other mechanism that is configured to interface with the cover 36 of the elongated cable 30 such that, once the distal end 34 of the elongated cable 30 has been inserted into or through the distal passage 24, the distal end 34 of the elongated cable 30 cannot thereafter be removed in an opposite direction. For example, the body 20 can have at least one detent (e.g., 25 in FIG. 1) associated with the distal passage 24 and configured to engage the textured outer surface 37 such that the distal end 34 of the elongated cable 30 can be restrained from being removed from the distal passage 24 in a reverse direction after having been inserted into the distal passage 24 in a forward direction. In one embodiment, as shown in FIG. 1, the detent 25 can be provided within the distal passage 24 of the body 20. While the detent 25 can be formed as a unitary and integral component of the body 20 during a molding, casting, machining or additive manufacturing process, it will be appreciated that alternatively the detent 25 can provided as a separate component that is attached to the body 20.

With the elongated cable 30 being intact as shown in FIGS. 1-2 and 4-6, the cam 50 can reside in a first position resulting in the striker 60 having an extended position, as shown in FIG. 1. When it becomes time to open a container associated with the locking assembly 10, a user can employ a bolt cutter or other suitable tool to sever or cut the elongated cable 30. When the elongated cable 30 cut as shown in FIG. 3, tension on the core 38 is broken, thus releasing compression of the spring 46. As a result, the proximal end ferrule 42 can be released to push upon the engagement face 52, resulting in movement of the cam 50 (about axis A1) from the first position to a second position. With the cam 50 moving to the second positon, the striker 60 can move to the retracted position as shown in FIG. 3. With reference to FIGS. 1 and 3, it can be seen that the magnet can be configured to move as the cam 50 moves from the first position to the second positon.

Referring now to FIGS. 4-7, a gateway can be configured for selectively interlocking with a locking assembly, such as will be described below. A gateway 70 is shown to include an outer housing 72 that can be formed by mating an upper shell 74 with a lower shell 76 to define an interior chamber 78. In one embodiment, the outer housing 72 can be formed from plastic, with the upper and lower shells 74 and 76 being attached together with one or more of adhesive, fasteners, radio frequency welding, gaskets and interlocking mechanical features. It will be appreciated that, in other embodiments, the outer housing can be formed from any of a variety of other suitable materials. In one embodiment, the upper and lower shells 74 and 76 can be attached together in a watertight configuration such that moisture is prevented from entering the interior chamber 78 during use of the gateway 70.

Figure 7:
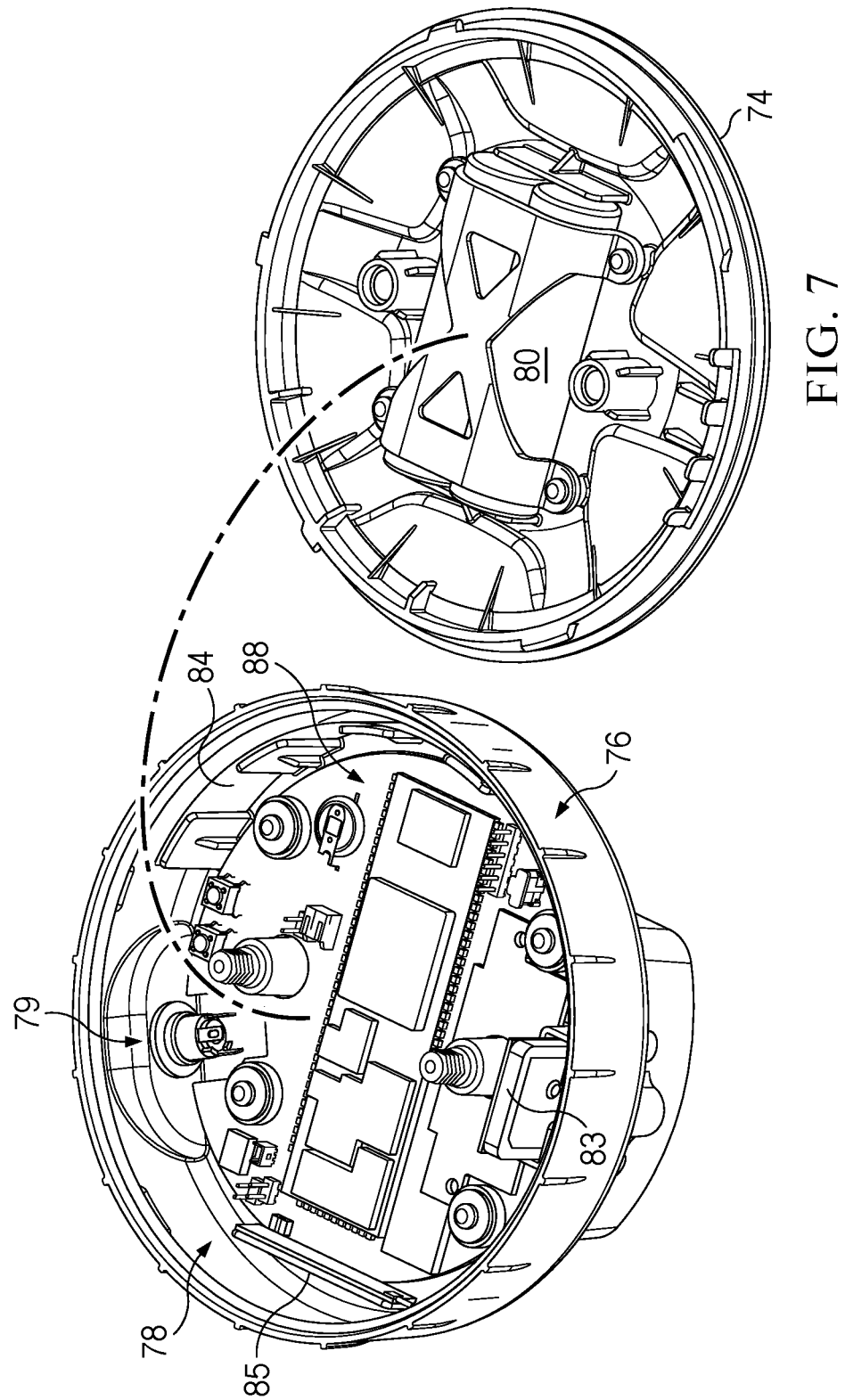
FIG. 7 is a partially exploded perspective view depicting the gateway of FIG. 4, but wherein upper and lower shells of an outer housing of the gateway have been disconnected, though wherein certain components have been removed and not shown, to facilitate clarity of illustration of selected components disposed within an interior chamber defined by the outer housing, in accordance with one embodiment.
Figure 8:
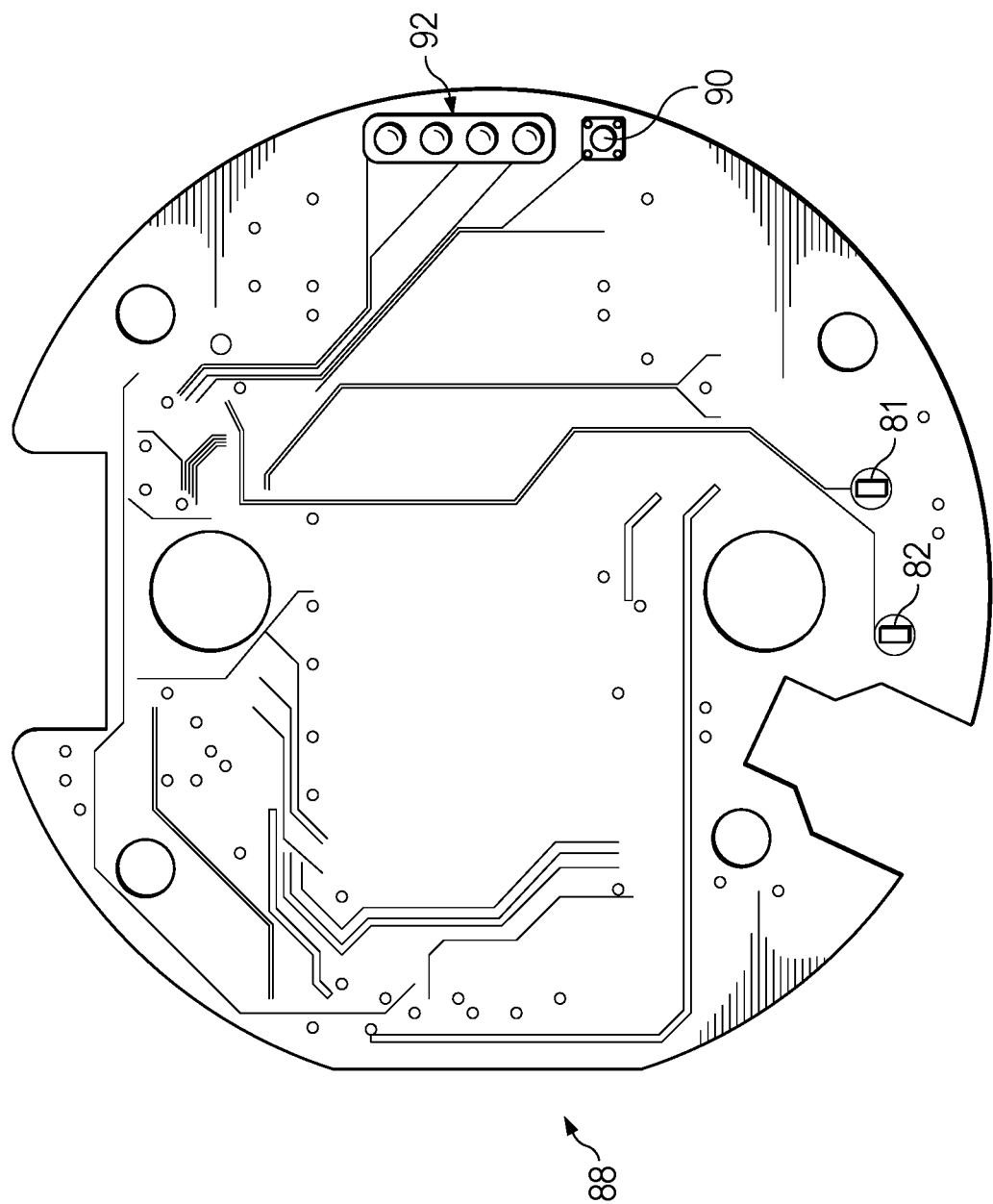
FIG. 8 is a perspective view depicting an underside of a circuit board of the arrangement of FIG. 7, in accordance with one embodiment.

The gateway 70 is shown to include a plurality of electrical components disposed within the interior chamber 78. In one embodiment, such as shown in FIGS. 7-8, those electrical components can be mounted or electrically connected to a circuit board 88 that is disposed within the interior chamber 78 and is configured to facilitate electrical coupling together of the various electrical components. Examples of such electrical components can include a radio communication device (e.g., one or more transceivers, transmitters and/or receivers), one or more sensors, one or more processors, one or more antennas, one or more batteries, one or more connection ports, one or more detectors, one or more indicators, and/or one or more control devices.

As shown in the example of FIGS. 7-8, a battery 80 can serve as a power supply for the gateway 70. The battery 80 can be a rechargeable battery, such as a lithium-ion battery, that can be recharged by electrical power provided through an electrical port 79. In another embodiment, a gateway can include a solar panel configured to generate electrical power for charging of the battery in response to solar energy impacting the gateway. In yet another embodiment, a gateway can include a micro-generator configured to generate electrical power for charging of the battery in response to experienced motion of the gateway. In yet another embodiment, a gateway can be configured to capture inductive power transmitted to the gateway by an external charging system, and to use this power for charging of the battery. It will be appreciated that, by forming the outer housing 72 from plastic, radio frequency signals for communications and/or charging can be well facilitated into and out from the interior chamber 78 of the gateway 70. It will be appreciated that, in addition or alternative to facilitating entry of power for charging of a the gateway 70, the electrical port 79 can in certain embodiments include one or more data transmission conductors to facilitate wired transfer of data to and/or from the gateway 70 during use, programming, calibration, docking, or other servicing of the gateway 70.

Figure 4:
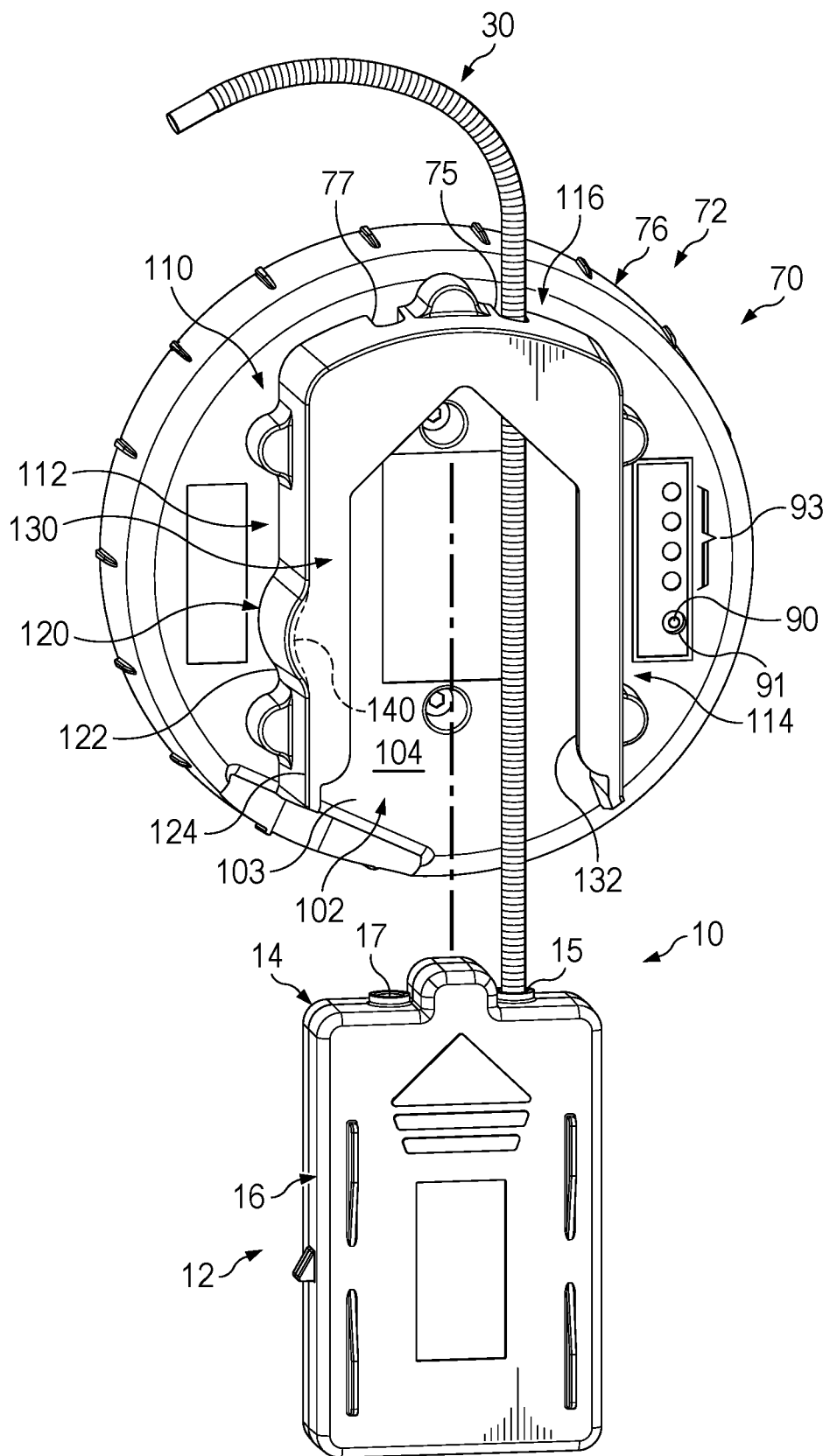
FIG. 4 is a perspective view depicting the locking assembly of FIG. 1, but with the upper shell included, and in process of being mated with a gateway to form a seal assembly in accordance with one embodiment.

In one embodiment, the gateway 70 can be provided with a display to facilitate visibility by an operator of the operating state (e.g., level of charge) of the battery 80 and/or other functionality of the gateway 70. For example, as shown in FIG. 8, a display 92 can comprise multiple LEDs (e.g., four LEDs) which, upon depression of a pushbutton 90, can illuminate a pattern to reflect a level of charge of the battery 80. The LEDs of the display 92 can be visible through one or more windows 93 provided in the outer housing 72, such as shown in FIG. 4. Likewise, the pushbutton 90 can be accessible to an operator through an aperture 91 provided in the outer housing 72, such as also shown in FIG. 4. In one embodiment, the one or more windows 93 can include transparent glass or plastic, and the aperture 91 can be fitted with a flexible seal member, each to facilitate prevention of rain or moisture from entering the interior chamber 78 during use of the gateway 70.

A gateway can further include a structure to facilitate its selective mechanical interlocking with a locking assembly. For example, as shown in FIG. 4, the lower shell 76 of the outer housing 72 is shown to have a bottom wall 103 and a side wall structure 110 which cooperate to at least partially define an exterior channel 102. In particular, the side wall structure 110 is shown to include a riser portion 120 and a ledge portion 130. In the example of FIG. 4, the side wall structure 110 and each of the riser portion 120 and the ledge portion 130 are shown to form a horseshoe shape. For clarification, the side wall structure 110 is shown to include leg portions 112 and 114 and connector portion 116, each corresponding with respective components of a horseshoe. A first end 122 of the riser portion 120 is shown to begin adjacent to an inner bearing surface 104 defined by the bottom wall 103, with the riser portion 120 extending longitudinally to a second end 124 from which the ledge portion 130 is shown to extend laterally inwardly. In this example, the ledge portion 130 can define an outer bearing surface 132.

Figure 5:
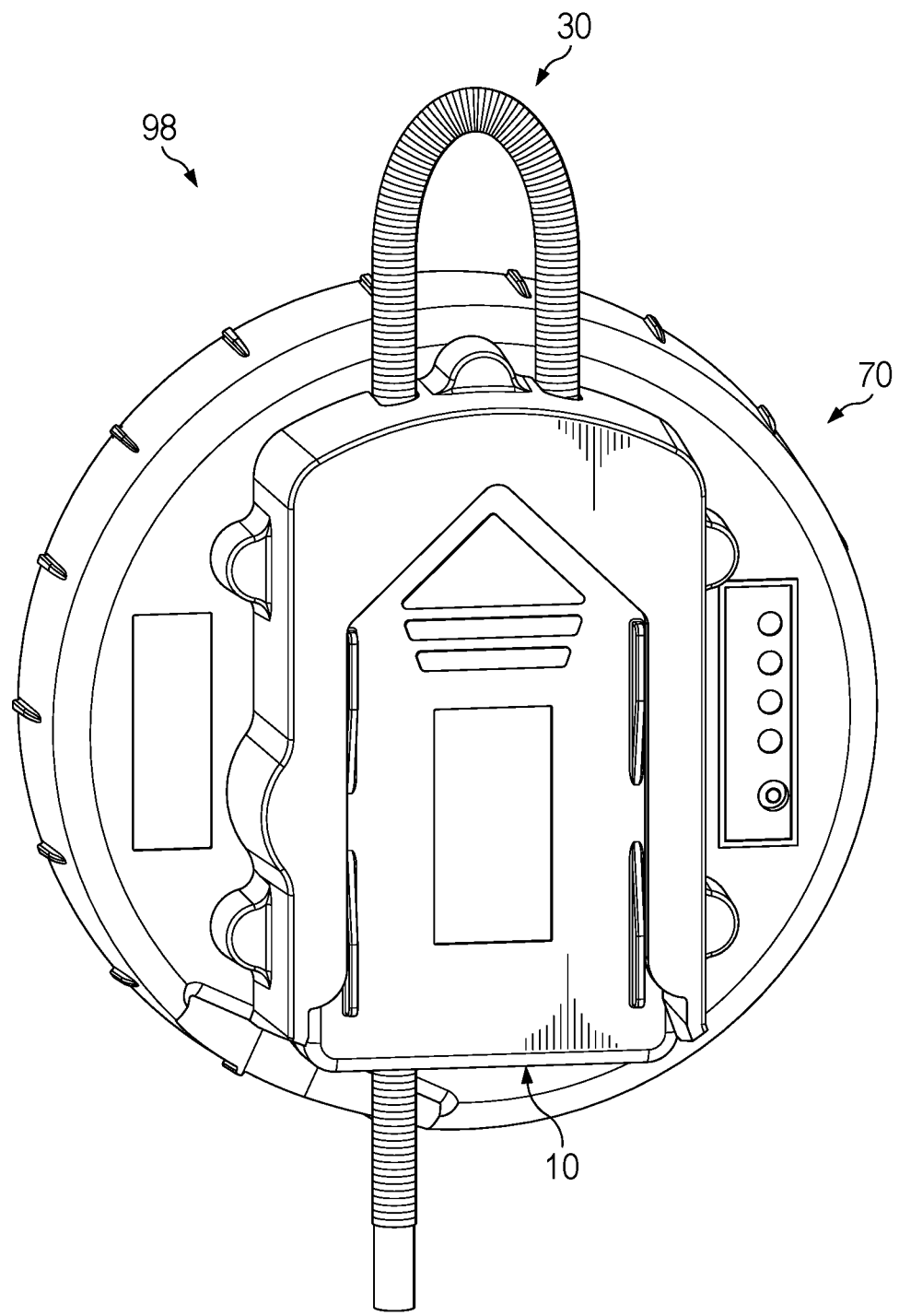
FIG. 5 is a perspective view depicting the arrangement of FIG. 4, but wherein the locking assembly is interlocked with the gateway, and the distal end of the elongated cable is in a locked position, in accordance with one embodiment.
Figure 6:
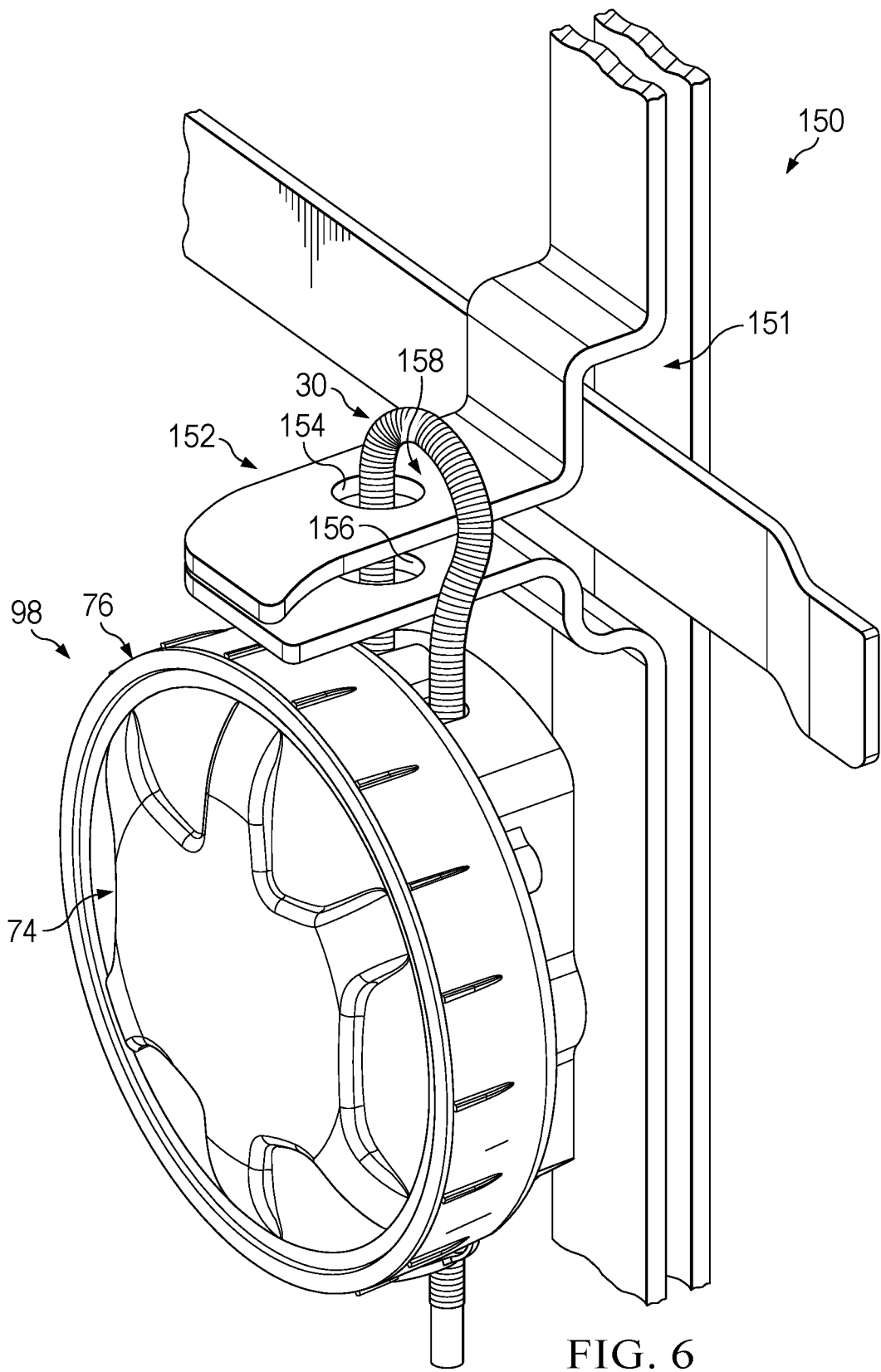
FIG. 6 is a perspective view depicting the seal assembly in the arrangement of FIG. 5, but wherein the elongated cable passes through apertures in a hasp of a container in accordance with one embodiment.

As will be appreciated with reference to FIGS. 4-5, the carrier 12 can be slidably received at least partially into the exterior channel 102 until it reaches a fully seated position relative to the gateway 70, as shown in FIGS. 5-6. In this position, the carrier 12 can be selectively interlocked with the gateway 70 (e.g., through use of the striker 60). In the fully seated position, and thus also when interlocked with the gateway 70, the carrier 12 can be at least partially constrained in a lateral direction between respective portions (e.g., corresponding with leg portions 112 and 114) of the riser portion 120, as well as at least partially constrained in a longitudinal direction between the inner bearing surface 104 and the outer bearing surface 132. In particular, the inner bearing surface 104 can contact the upper shell 14 of the carrier 12, with the outer bearing surface 132 contacting the lower shell 16 of the carrier 12.

In one embodiment, the outer housing 72 of the gateway 70 can further define a socket 140. More particularly, in one embodiment as shown in FIG. 4, the socket 140 can be formed as a recess in the side wall structure 110 of the gateway 70 (e.g., at a location corresponding with the leg portion 112). When the striker 60 of the locking assembly 10 is in the extended position (FIG. 1) and the locking assembly 10 is inserted into the exterior channel 102, a beveled surface 61 (FIG. 1) of the striker 60 can press against the side wall structure 110 (e.g., at a location corresponding with the leg portion 112), causing depression of the striker 60 to a retracted position (as in FIG. 3) under bias from the spring 48, until such time as the carrier 12 becomes fully inserted into the exterior channel 102 (FIG. 5), at which point bias from the spring 48 can cause the striker 60 to return to its extended position (as in FIG. 1) and enter the socket 140. It will be appreciated that, so long as the striker 60 extends into the socket 140, the carrier 12 can be thereby prevented from being removed from the exterior channel 102 of the gateway 70. In this way, the striker 60 in its extended position can be selectively receivable within the socket 140 to facilitate locking of the carrier 12 at least partially within the exterior channel 102, while the striker 60 in its retracted position can facilitate removal of the carrier 12 from the exterior channel 102.

A manner of interlocking the locking assembly 10 with the gateway 70 will now be described with reference to FIGS. 4-6. As a first step, a locking assembly 10 can be provided in an unlocked configuration, as shown in FIG. 4. The distal end 34 of the elongated cable 30 of the locking assembly 10 can be first routed through an opening 75 defined in the side wall structure 110 of the gateway 70 (e.g., at a location corresponding with the connector portion 116). The distal end 34 can then be routed through openings 154 and 156 of a hasp 152 of a container 150 as shown in FIG. 6, for example. The distal end 34 can then be routed through an opening 77 defined in the side wall structure 110 of the gateway 70 (e.g., at a location corresponding with the connector portion 116), and into the distal passage 24 of the body 20. In certain instances, the distal end 34 might be pushed sufficiently as to extend through a bottom opening (e.g., defined in part by recess 19 of the lower shell 16 as shown in FIG. 1), as will be appreciated with reference to FIG. 5. As previously indicated, once the distal end 34 is passed sufficiently into or through the distal passage 24 of the body 20, a detent 25 or other mechanical feature can restrain the elongated cable 30 from being removed from the distal passage 24 in a reverse direction.

It will thus be appreciated that, in certain embodiments, once the gateway 70 is interlocked with the locking assembly 10 and the distal end 34 of the elongated cable 30 is in the locked position, in order to avoid damage to the gateway 70, the elongated cable 30 can be cut in order to facilitate disengagement of the locking assembly 10 from the gateway 70. It will therefore be appreciated that, in the locked positon as shown for example in FIG. 6, the elongated cable 30 can cooperate with the gateway 70 to define a loop 158, with the loop 158 capturing the hasp 152 thereby locking a door 151 or other entry point of the container 150. Upon arrival of the container 150 at a destination, in order to open the door 151, the elongated cable 30 can be cut such as with a bolt cutter (e.g., 176 in FIG. 9), saw or other handheld tool, in particular at a longitudinal point upon the elongated cable 30 which is between its access to the gateway 70 through the openings 15 and 17 in the lower shell 76 of the gateway 70. Upon cutting of the elongated cable 30 in this manner, the seal assembly 98 can be removed from the hasp 152 and the door 151 of the container 150 can be opened.

The gateway 70 can include one or more electrical components configured to monitor the locking assembly 10. For example, such electrical component(s) can enable the gateway 70 to determine if the locking assembly 10 is in a fully seated position within the exterior channel 102 and/or interlocked with the gateway 70. More particularly, such electrical component(s) can enable the gateway 70 to determine the position of the cam 50 of the locking assembly 10, such as to facilitate detection of whether the elongated cable 30 remains intact or has been cut. In one example, such electrical components comprise sensors, namely a first magnetic detector 81 and a second magnetic detector 82. In one embodiment, each of the first magnetic detector 81 and the second magnetic detector 82 can comprise a respective Hall effect sensor. However, it will be appreciated that, in other embodiments, one or more magnetic detectors of a gateway can comprise a different type of component such as, for example, a reed switch.

In one embodiment, the first magnetic detector 81 and the second magnetic detector 82 can each be attached to the circuit board 88 such as at locations generally shown, for example, in FIG. 8, so that they can be near and configured to selectively receive a magnetic field produced by the magnet 54 of the cam 50. For example, in the embodiment of FIGS. 1-8, when the carrier 12 is received at least partially within the exterior channel 102 (e.g., in a fully seated position) and the cam 50 is in the first position, the first magnetic detector 81 can detect the magnetic field of the magnet 54 through both the outer housing 72 and the carrier 12. But, when the cam 50 is in the second position, the first magnetic detector 81 can be configured not to detect the magnetic field of the magnet 54. In this example, by detecting the magnetic field from the magnet 54, the first magnetic detector 81 can confirm that the locking assembly 10 has indeed been interlocked with the gateway 70 and the elongated cable 30 has not yet been cut.

Still further in the example of FIGS. 1-8, when the carrier 12 is received at least partially within the exterior channel 102 (e.g., in a fully seated position) and the cam 50 is in the second position, the second magnetic detector 82 can detect the magnetic field of the magnet 54 through the outer housing 72 and the carrier 12. But, when the cam 50 is in the first position, the second magnetic detector 82 can be configured not to detect the magnetic field of the magnet 54. In this example, by detecting the magnetic field from the magnet 54, the second magnetic detector 82 can confirm that the elongated cable 30 has been cut while the locking assembly 10 is in a fully seated position within the exterior channel 102. Further, if the magnetic field of the magnet 54 is not detected by either the first magnetic detector 81 or the second magnetic detector 82 within a certain period of time (e.g., a few seconds), it can be determined that the locking assembly 10 no longer remains in a fully seated position and/or is interlocked with the gateway 70.

A processor attached to the circuit board 88 can be electrically coupled with each of the first magnetic detector 81 and the second magnetic detector 82, as well as with one or more radio communication devices of the gateway 70, such as including antennas 83, 84 and 85. The processor can be configured to operate the radio communication device to transmit a first signal upon detection by a sensor, for example the first magnetic detector 81, of full seating or interlocking of the gateway 70 with the locking assembly 10. The processor can be further configured to operate the radio communication device(s) to transmit a second signal upon detection by the sensor, for example the second magnetic detector 82, that the elongated cable 30 has been cut.

It will be appreciated that the aforementioned detection of magnetic field can be accomplished, as in the embodiment of FIGS. 1-8, without there being any electronic components within the locking assembly 10 or electrical connection between the locking assembly 10 and the gateway 70, thus allowing for simplicity and cost-effectiveness of the locking assembly 10, the gateway 70 and overall the seal assembly 98. However, in other embodiments, a locking assembly can include one or more electrical components, and/or different types of sensors can be employed to detect interlocking of a locking assembly with a gateway. For example, in one or more alternative embodiment(s), a gateway can include a pushbutton switch configured to be depressed upon engagement of the gateway with a locking assembly, and/or can employ a continuity detection circuit to detect whether an elongated cable of a locking assembly has been cut. Such a continuity detection circuit can measure continuity of the elongated cable from its proximal end to its distal end, or from its proximal end to its passage through a distal passage of a body. In another example, the elongated cable can be provided as a coaxial cable having respective conductors joined at the distal end wherein continuity can be determined by monitoring the respective conductors of the coaxial cable at the proximal end.

The gateway 70 can further include one or more additional sensors or detectors. For example, in one embodiment, the gateway 70 can include a detector electrically coupled with the processor and configured to monitor environmental conditions experienced by the gateway 70 such as for example, temperature, humidity, and/or vibration. The gateway 70 can additionally or alternatively include a location detector (e.g., global positioning system ("GPS")) electrically coupled with the processor and configured to identify a geographic location of the gateway 70. Still further, the processor of the gateway 70 can additionally or alternatively be configured to operate a radio communication device (e.g., involving one or more of antennas 83, 84 and 85) to communicate with cargo stored within an associated container and to receive environmental data concerning the environmental conditions experienced by the cargo. In such an embodiment, the processor can be configured to operate the radio communication device to transmit a third signal, wherein the third signal relates to the environmental data.

It will be appreciated that use of a customized carrier (e.g., 12) as part of a locking assembly can facilitate use of simple, inexpensive and/or conventional common commodity security seal components to provide one or more other components of the locking assembly (e.g., the body and/or elongated cable). It will also be appreciated that, in other embodiments, a locking assembly or components thereof can be provided to have any of a variety of other suitable configurations and form factors alternative to those shown in FIGS. 1-8. For example, in one alternative configuration, a locking assembly can omit a carrier, for example, such that the body can directly selectively mate and interlock with the gateway. Further, while the locking assembly has been described to slidingly interface the gateway 70 to facilitate interlocking thereof, it will be appreciated that, in other embodiments, a locking assembly and/or portion(s) thereof can interlock with a gateway in any of a variety of suitable alternative mechanically interlocking configurations. While the seal assembly 98 has been described to include a locking assembly having an elongated cable 30 and a body 20, it will be appreciated that in other embodiments, a locking assembly can include another type of flexible member (e.g., a plastic tie) or an inflexible member (e.g., a security bolt or shackle).

A method of managing logistics involving the seal assembly 98 will now be described with reference to FIG. 9. An order for cargo 160 can first be dispatched from a logistics instructional facility 170, as shown with respect to step 1 in FIG. 9. Cargo 160 can be provided with one or more TNT devices (e.g., 174), as shown with respect to step 2 in FIG. 9. TNT devices can be configured to monitor environmental conditions (e.g., temperature, location, ambient light, acceleration, and/or volatile organic compounds (VOCs)) associated with the cargo, such as respective cases or pallets thereof. It will be appreciated that acceleration can be indicative of vibration, and VOCs can be indicative of ripeness or degradation of fresh products (e.g., meats, vegetables, and/or fruit). In one embodiment, the TNT devices can each be programmed with individual identification information for its associated case or pallet, and can additionally be programmed with acceptable environmental conditions and/or intended manifest information for the associated case or pallet. The seal assembly 98, and more particularly the gateway 70, can facilitate a wireless relay between sensors (e.g., within TNT device 174) at or within the container 150 and the outside world, in real time, to a cloud platform for monitoring and analytics. Operation of example TNT devices (e.g., 174) and associated systems and methods can be appreciated with reference to U.S. Pat. No. 11,468,755 which granted on Oct. 11, 2022, the entirety of which is hereby incorporated herein by reference. Further examples of suitable TNT devices are described below and with respect to FIGS. 10-14.

It is understood that at least one aspect/functionality of various embodiments described herein can be performed in real time. As used herein, the term "real time" is directed to an event/action that can occur instantaneously or almost instantaneously in time when another event/action has occurred. For example, the "real-time processing," "real-time computation," and "real-time execution" all pertain to the performance of a computation during the actual time that the related physical process occurs, in order that results of the computation can be used in guiding the physical process.

Figure 9:
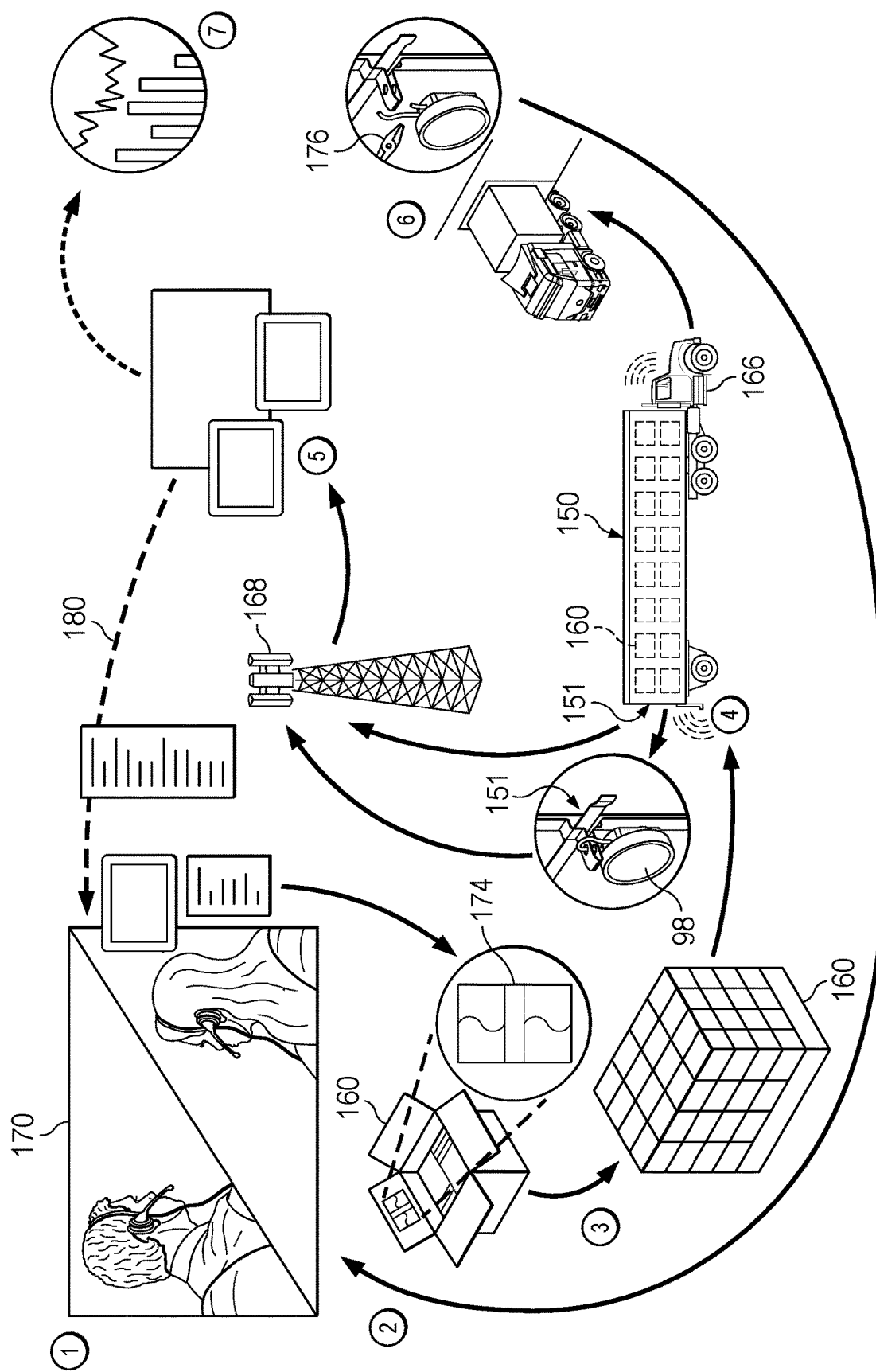
FIG. 9 is system diagram depicting use of the seal assembly of FIG. 5 in accordance with one embodiment.

The cargo 160 can then be loaded into a container 150, such as a refrigerated trailer, with a seal assembly 98 then used to seal the door 151 of the container 150, thereby facilitating transportation of the container 150 by a vessel (e.g., a tractor 166) operated by a transporting agent along a route, as shown with respect to step 4 of FIG. 9. Upon engagement of the locking assembly 10 with the gateway 70, the gateway 70 can detect and provide a physical and electronic locking of the container 150, and in some embodiments commence communications with TNT devices (e.g., 174) within the container 150. During such time as the seal assembly 98 retains the door 151 in a locked position, the seal assembly 98 can wirelessly communicate (e.g., via RFID, Bluetooth or other suitable communication protocol) with the TNT devices (e.g., 174) disposed within the container 150. Upon gathering of information from the respective TNT devices (e.g., 174) within the container 150, the gateway 70 can communicate directly or indirectly to a cell tower 168, as shown with respect to step 5 of FIG. 9, in whole or in part and including aggregations thereof and/or information derived therefrom. The cell tower 168 can then relay the data to a monitoring facility, such as a quality control supervisor (e.g., or the owner of the cargo), where the parameters of the transportation of the cargo can be monitored in real time. It will be appreciated that the gateway 70 can be configured to facilitate and communicate within a mesh network including other such gateways (e.g., similar to 70), such as when the gateway 70 is not itself within communication range of a cell tower, repeater, or other communication network, or when wireless signals from the gateway 70 are shielded by environmental factors. This can be particularly helpful when containers are stacked deep and wide upon a cargo ship, for example.

If any concern or problem is discovered, such as if the cargo is deemed to be in distress, a communication 180 can be dispatched from the quality control supervisor to the logistics instructional facility 170 with instruction to remedy the concerning condition. Through continued and ongoing monitoring of data from the gateway 70, the quality control supervisor can verify that the concerning condition was remedied or resolved. In this way, it will be appreciated that the quality control supervisor can prevent damage or delay in delivery of the cargo before it occurs.

Upon arrival of the container at a destination, the elongated cable 30 of the seal assembly 98 can be cut, and the gateway 70 can accordingly inform the logistics instructional facility 170 accordingly, as shown for example with respect to step 6 in FIG. 9. In addition to facilitating this electronic notification, it will be appreciated that cutting of the elongated cable 30 can additionally provide visual indication to persons inspecting the container 150 that the door 151 of the container 150 is not secured and perhaps has been opened.

As noted, such in the example of FIG. 9, the logistics instructional facility 170 can receive signals from the gateway 70. Such signals can reflect, for example, that the locking assembly 10 is interlocked with the gateway 70, that the elongated cable 30 has been cut, and various location and/or environmental information concerning the cargo. For example, a signal from the gateway 70 can reflect that the environmental conditions are undesirable for the cargo, such as determined by data from sensors within the gateway 70 or cargo data received by the gateway 70 from TNT devices 174. In response to receipt of such a signal by a quality control supervisor, the transporting agent (e.g., truck driver or ship captain) can be requested (e.g., directly or indirectly by the quality control supervisor) to modify a characteristic of the transportation of the container.

As another example, a signal from the gateway 70 can reflect whether the container is moving along a particular route. In response to receipt of such a signal, the quality control supervisor can predict whether the route is undesirable due to a condition (e.g., excess heat, adverse weather, road closure, or potential presence of thieves) and, in response to the predicting, request the transporting agent to replace the route with a different route and/or modify another characteristic of the transportation of the container. After modifying or replacing the route, the quality control supervisor can monitor further signals from the gateway 70 to ensure that the container is moving along the different route and/or that the different route presents satisfactory conditions.

After receiving a signal from the gateway 70 that the elongated cable 30 has been cut, the quality control supervisor can then verify that location data received from the gateway 70 that the container has reached its intended destination. Also, upon cutting of the elongated cable 30, the gateway 70 can be configured for re-use, such as by replacing the locking assembly 10 with a new locking assembly, downloading data from the gateway 70, reprogramming the gateway 70 to associate with cargo of another container, and/or recharging of the battery 80 housed within the gateway 70.

Through this configuration, real-time inventory control, verification and status reporting can be achieved at a remote monitoring facility, such as by facilitating scheduled, occurrence prompted or instructed communications by the seal assembly 98 alone and/or with one or more TNT devices (e.g., 174) within the container 150. Likewise, a logistics monitoring service, through use of a seal assembly 98 as described herein, can facilitate identification of inappropriate environmental conditions and/or local damage during storage or shipment, promptly upon occurrence, in order that the cause and locus of the damage can be identified, and in order that intervention can be applied promptly in order to avoid further damage or complete loss. As an additional and longer term benefit, a cargo owner or quality control supervisor can aggregate data pertaining to individual and past events, and can itself employ that aggregated data to better inform its future transportation activities, and/or can share or sell that data for the benefit of others, as shown for example with respect to step 7 in FIG. 9.

In one embodiment, the gateway 70 of the seal assembly 98 can include a GPS detector to facilitate its determination of location, and/or can assess location through use of another proximity system. The gateway 70 can communicate this determined location to enable a supervisor to identify a location of an associated container, e.g., on a roadway, at a customer's facility, or within a freight storage yard. In this way, if the determined location is deemed to be improper, the container can be efficiently redirected or recovered. On the basis of location or measured environmental conditions, data communicated by the gateway 70 can facilitate identification, intervention and rescue of shipments in distress. Such an arrangement can further facilitate identification of inappropriate environmental conditions and/or local damage during storage or shipment, promptly upon occurrence, in order that the cause and locus of the damage can be identified, and in order that intervention can be applied promptly in order to avoid further damage or complete loss. Through monitoring of location and locking status of the container and/or other conditions (e.g., optionally involving a camera), tamper can be detected, theft of cargo can be deterred, and bad actors identified.

It will be appreciated that the devices, systems and methods as described herein can facilitate effective monitoring of a container and its cargo, starting from dispatch, wherein at least some of the cargo is unloaded from the container at an intermediate destination and remaining cargo continues to a further destination. Such a situation can occur with a freight forwarding service, for example. In such situations, serialization and uniqueness of open/close events can be monitored and recorded, including an identification and recordation of cargo (through interaction with TNT devices) before and after each of such open/close events.

It will be appreciated that use of seal assemblies (e.g., 98) and associated methods as described herein can be readily and conveniently accommodated by the existing shipping and logistics environments. For example, due to use of locking assemblies and/or processes which can have some similarity with conventional devices and processes of sealing containers, receiving workers need not be significantly retooled or retrained to facilitate their opening and unloading of containers. It will be appreciated that by providing electronics within a seal assembly (e.g., 98) as described herein, a container and/or vessel need not themselves be physically modified or equipped with electronics, for example, capable of communicating with TNT devices associated with cargo. As such, it will be appreciated that a seal assembly can be attached to a container using non-permanent methods. This allows people who don't own the container or vessel to monitor their cargo in real time, and enables the owner of cargo to monitor their cargo directly, without involvement or reliance upon a carrier or intermediate logistics facilitators. In this way, the present methods and systems provide cargo owners with a level of independence from the first, second and third party logistics providers, thereby allowing the cargo owners to directly monitor their cargo in real time without interacting with any of the first, second and third party logistics providers. Through use of reusable gateways (e.g., 70), the present systems and methods can provide benefits in cost and environmental sustainability.

While in one embodiment the seal assembly 98 can wirelessly communicate (e.g., via RFID, Bluetooth or other suitable communication protocol) from outside the container 150 with TNT devices (e.g., 174) disposed within the container 150, it will be appreciated that in other embodiments an antenna or tail can be electrically coupled to a seal assembly and extend into a container. In one embodiment, such an antenna or tail can facilitate enhanced wireless communication between the seal assembly and the TNT devices present within the container. In another embodiment, the antenna or tail can comprise one or more sensors to facilitate measurement of environmental conditions within the container (e.g., temperature, vibration and/or VOCs), and to provide corresponding electrical signals representative thereof to the seal assembly. The antenna or tail can be provided as an integral component of a seal assembly, or instead can be provided separately from the seal assembly and configured for selective electrical coupling with a seal assembly. For example, in this latter case, the antenna or tail can be provided as a fixed or permanent component of a container, or instead can be configured for temporary placement into a container prior to closure and shipping of the container once filled with cargo.

Figure 10:
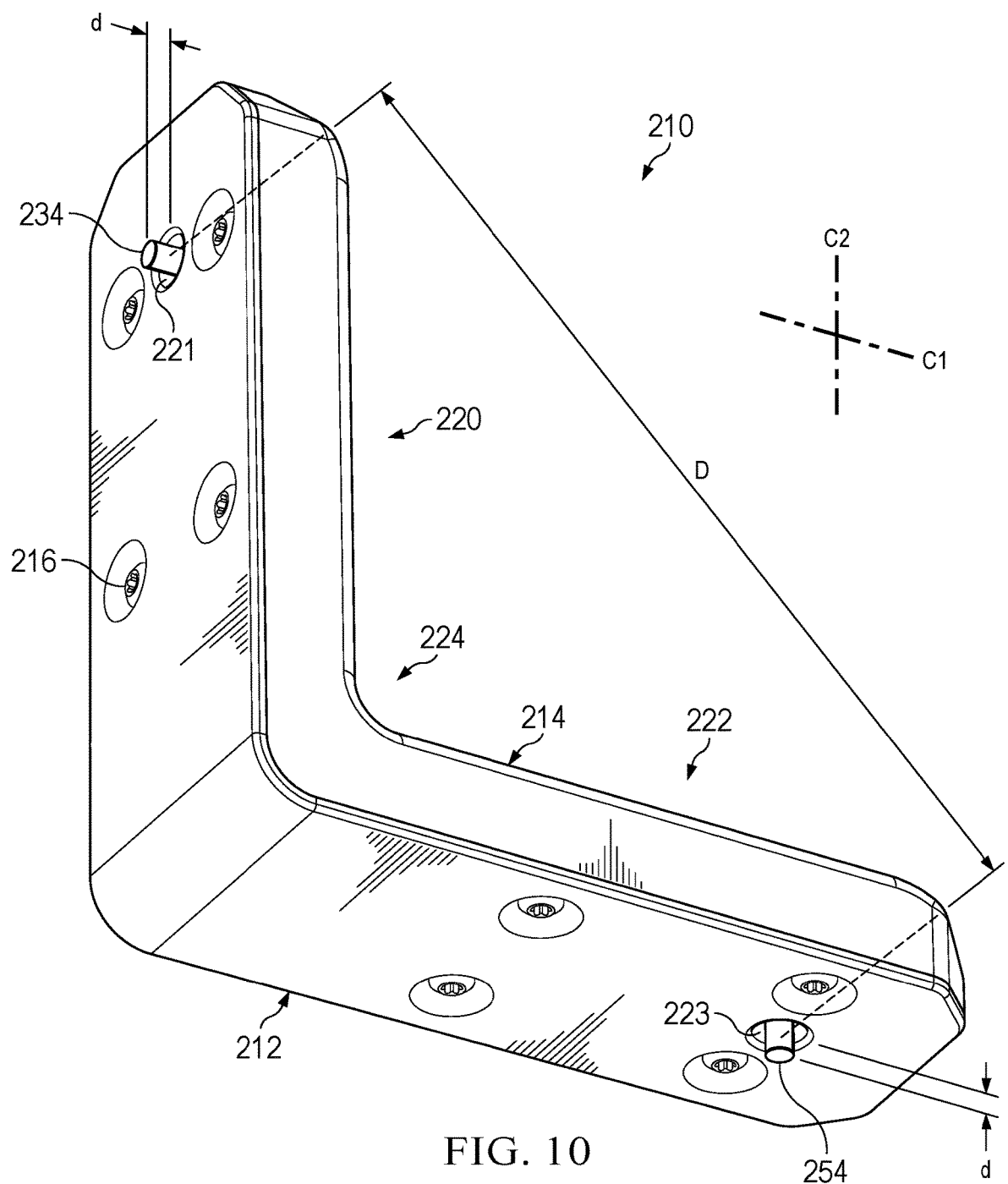
FIG. 10 is a perspective view depicting a track-n-trace ("TNT") device in accordance with one embodiment.
Figure 11:
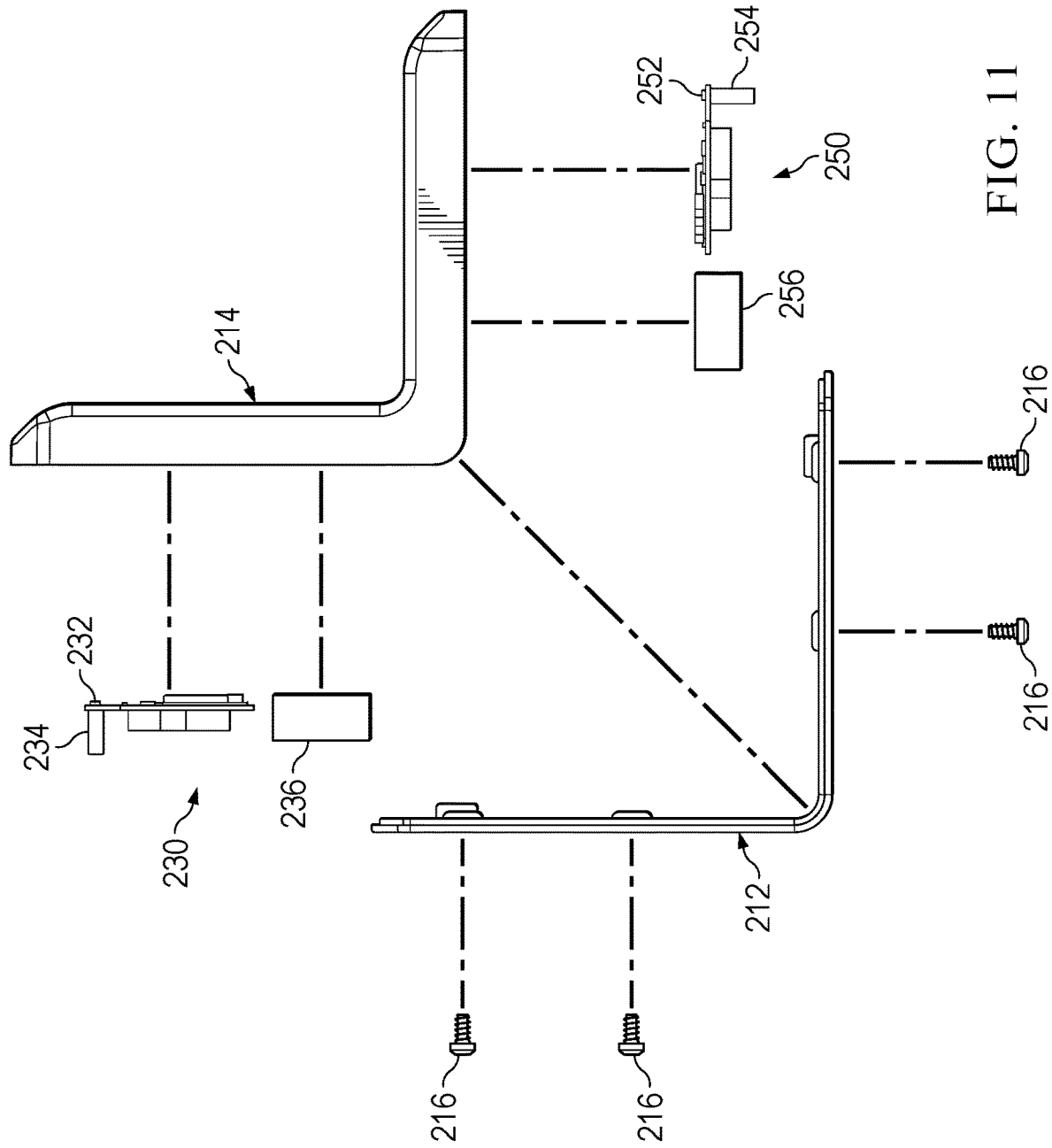
FIG. 11 is a partially exploded side elevational view depicting the TNT device of FIG. 10, wherein certain components have been removed and not shown to facilitate clarity of illustration.
Figure 14:
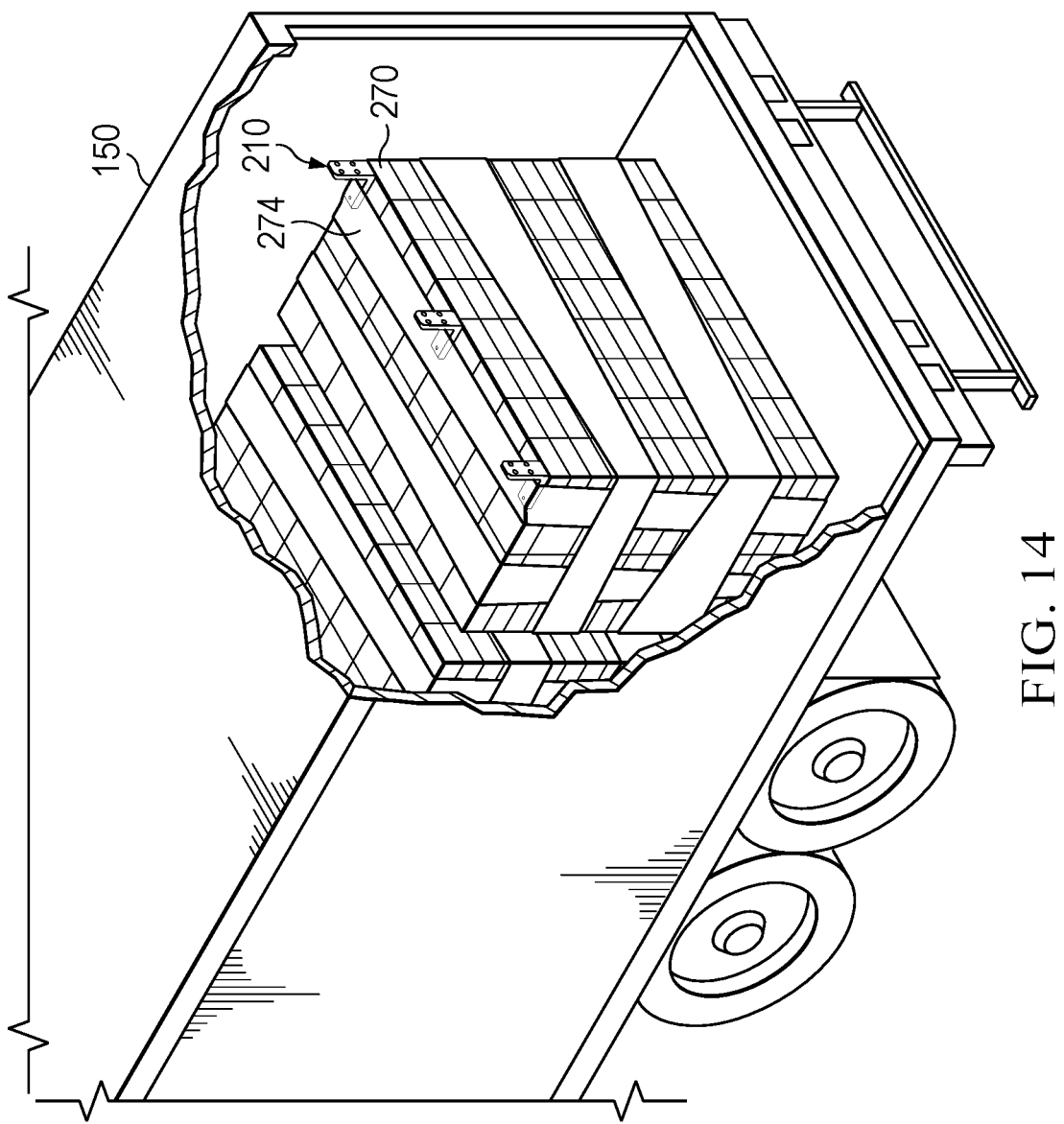
FIG. 14 is a perspective view depicting the TNT device of FIG. 10 used in association with a corrugated container.

It will be appreciated that a seal assembly (e.g., 98) as described herein can be used in conjunction with a Transportation Predictive Analytics ("TPA") tool, though it will be appreciated that a TPA tool as described herein can alternatively be facilitated through use of any of a variety of other suitable communication devices associated with cargo, containers, and/or vessels. It will also be appreciated that one or more TNT devices can provided, for example, in association with a seal assembly (e.g., 98), to facilitate a TPA tool. For example, FIGS. 10-11 illustrate a TNT device 210 that is configured to be attached to cargo (e.g., 160 in FIG. 9) within a container (e.g., 150 in FIG. 9), and to communicate with a gateway of a seal assembly (e.g., 98 in FIG. 9) associated with that cargo. FIG. 14 illustrates one particular manner in which the TNT device 210 can be attached to cargo. More particularly, as shown in FIG. 14, one leg of the TNT device 210 can be held tightly against corrugated material (e.g., cardboard) of a carton 270, such as with shrink wrap 274, while another leg of the TNT device 210 can protrude away from the carton 270 into the ambient air of the headspace of a container. While the protruding leg is shown in FIG. 14 to extend upwardly into the ambient air, it will be appreciated that the TNT device 210 can alternatively be mounted with the protruding leg extending laterally outwardly from the cargo, such as with the retained or non-protruding leg being plastic wrapped or otherwise held in a vertical position adjacent to a side wall of a carton, for example.

In the arrangement of FIG. 14, it will be appreciated that the TNT device 210 can be configured to simultaneously measure, record and transmit two temperatures, namely a product case temperature and a headspace temperature. The product case temperature can be the measured temperature of the corrugated material of the carton 270 that is in contact with the TNT device 210. With the TNT device 210 placed on the carton 270 as shown in FIG. 14, it will be appreciated that there can be no penetration or alteration of the product case or carton 270 by the TNT device 210, thereby preserving integrity and sell-ability of the carton 270. The measured headspace temperature provides insights into the temperature variations within the container and is useful in detecting abnormal temperature excursion in the container. Temperature excursions may occur due to planned or unplanned opening and closing of the door of the container, as well as extended storage or non-movement of a container (e.g., parking of a trailer for extended periods of time). The headspace temperature can also provide a check and bound for the temperature of the product or cargo itself.

The TNT device 210 can wirelessly transmit both the product case temperature and the headspace temperature to the gateway (e.g., 70), and the gateway can relay that data to a quality control supervisor such as described above. Through use of a TPA tool as described herein, the quality control supervisor can estimate the temperature of the product or cargo during shipment. More particularly, the TPA tool can include a data processing algorithm that uses this information to estimate the actual product temperature, namely the temperature of the product stored within the carton 270. More particularly, by knowing the product case temperature and the headspace temperature over time, the TPA tool can extrapolate to provide a reliable estimate of the temperature of the product itself during shipment, such as stored within that carton and other cartons within a container during transit. This can provide a very useful tool to facilitate corrective action in the event of abnormality such as change in traffic pattern, breakdown of a tractor, etc.

In order to facilitate simultaneous measurement of both product case temperature and headspace temperature, it will be appreciated that the TPA tool can have at least two thermal sensors such as thermistors or thermocouples, for example. For example, the configuration of the TNT device 210 of FIG. 14 can be further understood with reference to FIGS. 10-11. For example, the TNT device 210 is shown in FIGS. 10-11 to have an outer housing formed in a clam shell like arrangement through interaction of a frame 212 with a cover 214. In one embodiment, the frame 212 and the cover 214 can be attached with screws (e.g., 216), though it will be appreciated that a frame and cover of a TNT device can additionally or alternatively be attached together with one or more of adhesives, radio frequency welding, gaskets and interlocking mechanical features. In one embodiment, both the frame 212 and the cover 214 can be formed from plastic, through it will be appreciated that, in other embodiments, one or both of the frame 212 and the cover 214 can be formed from any of a variety of other suitable materials. In still further embodiments, it will be appreciated that an outer cover of a TNT device might be formed as a unitary structure, such as for example a single molded piece of plastic. The TNT device 210 and its outer housing are each shown to have the shape of an "L", namely with a first leg 220 and a second leg 222 being generally perpendicular and meeting at an intersection 224. In other embodiments, an outer housing of a TNT device can have any of a variety of other suitable shapes (e.g., as in the example of FIGS. 12-13).

As will be appreciated, the frame 212 can cooperate with the cover 214 to define an internal cavity. In one embodiment, one or more circuit boards, sensors, power supplies (e.g., batteries), and antennas can reside at least partially within the internal cavity. In the example of FIGS. 10-11, a circuit board 230 and an antenna 236 can reside within a portion of the internal cavity corresponding with the first leg 220 of the TNT device 210. A thermal sensor 232 attached to the circuit board 230 can be provided with a conductor 234 extending through an aperture 221 in the cover 214 to facilitate its thermal interaction with a location external of the TNT device 210. Likewise, a circuit board 250 and an antenna 256 can reside within a portion of the internal cavity corresponding with the second leg 222 of the TNT device 210. A thermal sensor 252 attached to the circuit board 250 can be provided with a conductor 254 extending through an aperture 223 in the cover 214 to facilitate its thermal interaction with a location external of the TNT device 210. In one embodiment, some or all of the remaining space within the internal cavity can be filled with foam or other material intended to provide temperature insulation surrounding each of the thermal sensors 232 and 252 and conductors 234 and 254. In one example, the conductors 234 and 254 each comprise a respective piece of metal wire formed from copper or some other material and soldered, glued or otherwise mated with the respective thermal sensor 232 and 252, though it will be appreciated that the conductors can alternatively be provided in any of a variety of other suitable configurations.

It can be seen that the conductors 234 and 254 can extend outwardly from the frame 212 of the outer housing (e.g., by a distance d in FIG. 10) such that, for example, the one of the conductors 234 and 254 that is positioned to contact corrugated material of a product case or carton can be configured to gently depress into the corrugated material itself, in order to facilitate effective heat transfer from the corrugated material to the conductor and associated thermal sensor. In this configuration, the other of the conductors 234 and 254 can extend outwardly from the frame 212 of the outer housing (e.g., by a distance din FIG. 10) to extend into the ambient air in the headspace of a container, in order to facilitate effective heat transfer from the ambient air to the conductor and associated thermal sensor.

It can be seen that the conductors 234 and 254 are sufficiently spaced from one another (e.g., a distance "D" in FIG. 10) such that measurement of the ambient air temperature is not meaningfully affected by temperature of the cargo, and such that measurement of the temperature of the cargo is not meaningfully affected by temperature of the ambient air. In one embodiment, this spacing is greater than about one inch. In another embodiment, this spacing is greater than about two inches. In another embodiment, this spacing is greater than about three inches. In still a further embodiment, this spacing is about three inches. In the illustrated example of FIGS. 10-11 and 14, it will be appreciated that conductors 234 and 254 are shown to extend along respective longitudinal axes that insect one another perpendicularly.

It will be appreciated that the conductor 234 can extend along a first longitudinal axis (C1 in FIG. 10) while extending from the internal cavity, through the aperture 221 in the outer housing, and to an environment external to the TNT device 210. Likewise, the conductor 254 can extend along a second longitudinal axis (C2 in FIG. 10) while extending from the internal cavity, through the aperture 223 in the outer housing, and to an environment external to the TNT device 210. In one embodiment, as shown in FIG. 10, the first and second longitudinal axes C1 and C2 can insect one another perpendicularly.

A respective battery can be provided on or electrically connected with each of the circuit boards 230 and 250, or a common battery can be provided. In this configuration, an accelerometer or other sensor can be provided on or electrically connected with one or both of circuit boards 230 and 250, such as for use in determining which respective one of the first leg 220 and the second leg 222 is vertical and horizontal. One or more controllers (e.g., a processor) can also be provided on one or both of the circuit boards 230 and 250. In an alternative embodiment, it will be appreciated that only a single circuit board can be provided within an internal cavity defined by an outer housing of a TNT device, wherein the single circuit board can support or be connected with a power supply (e.g., a battery), an antenna, an accelerometer and/or other sensors, two (or more) respective temperature thermal sensors, and a controller.

It will therefore be appreciated that with the TNT device 212 provided as shown in FIG. 14, one of the thermal sensors (e.g., 232) can be configured to detect product case temperature, while the other one of the thermal sensors (e.g., 252) can detect headspace temperature within the trailer or container. Based upon information from an accelerometer or other sensor of the TNT device 212, the TNT device 212 or associated gateway or TPA tool can determine which of the thermal sensors (e.g., 232, 252) is detecting product case temperature and headspace temperature. Through use of the antennas 236 and 256 connected with the respective circuit boards 230 and 250 such as with wiring, the controller(s) on one or both of the circuit boards 230 and 250 can facilitate communication of the temperature and positional information to a gateway associated with the container. Again, it will be appreciated that in alternative embodiments, a TNT device having two (or more) thermal sensors can include only a single circuit board and a single antenna to facilitate communication of temperature information from both thermal sensors to a gateway.

Figure 12:
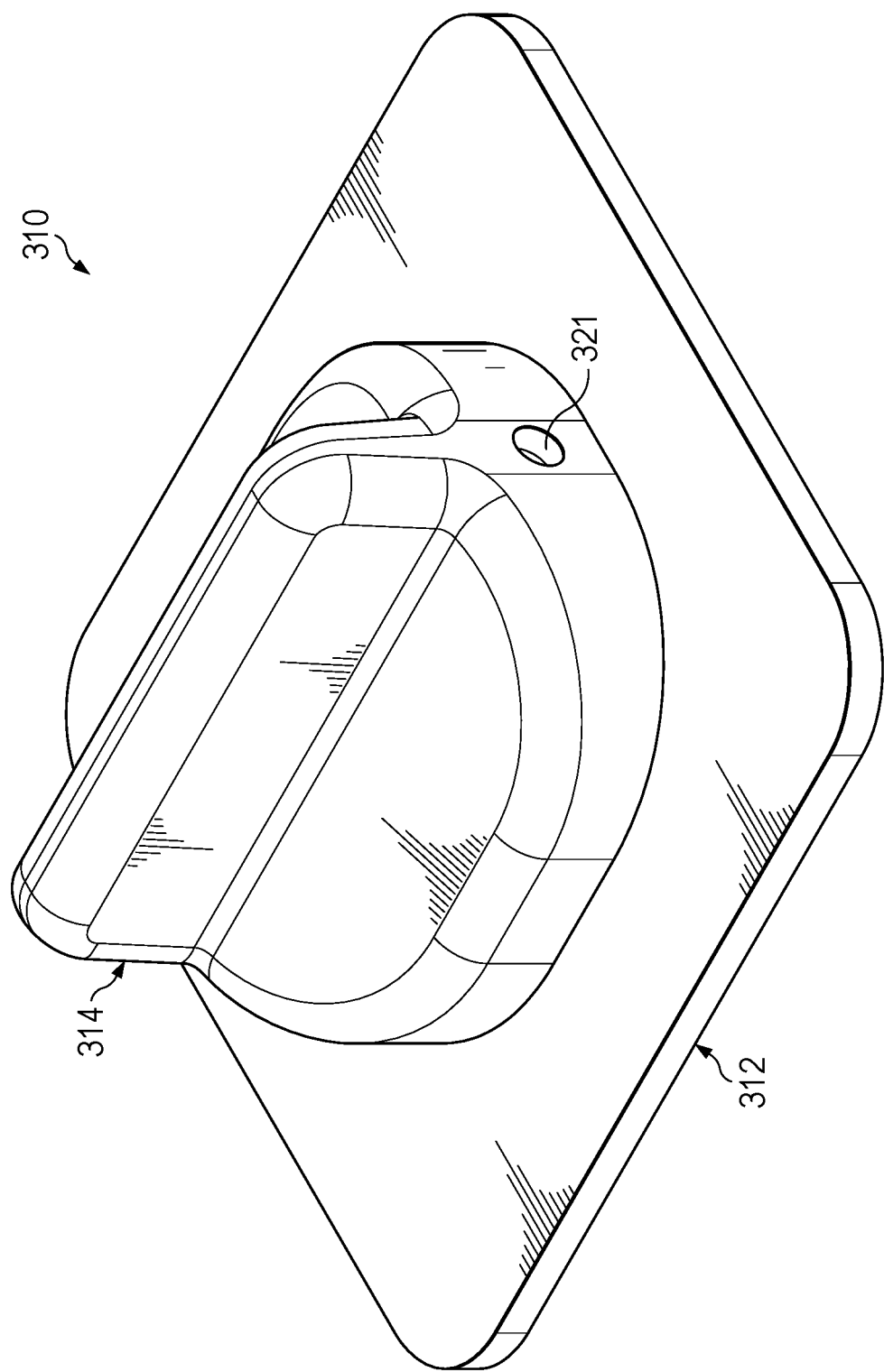
FIG. 12 is a perspective view depicting a TNT device in accordance with another embodiment
Figure 13:
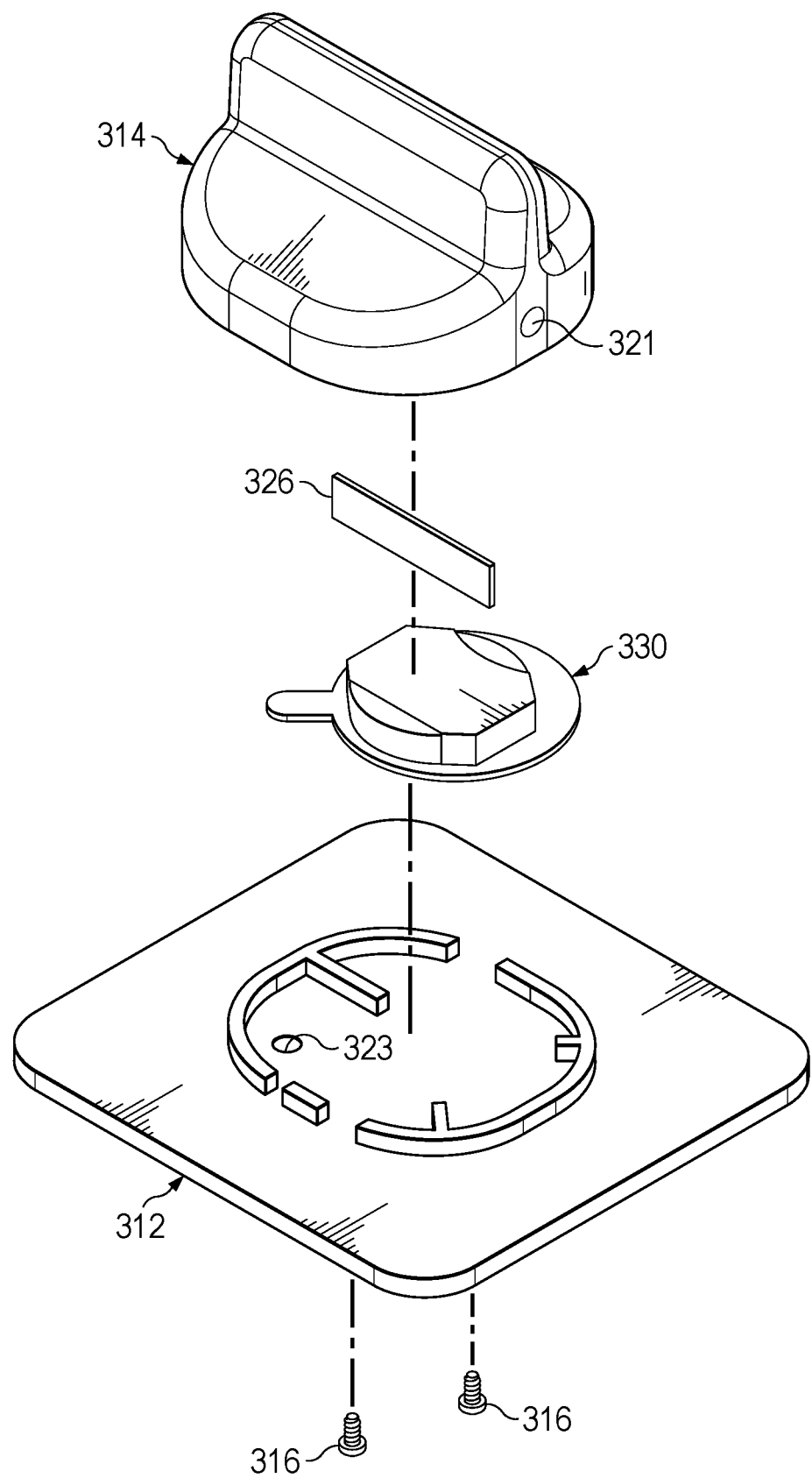
FIG. 13 is a partially exploded perspective view depicting the TNT device of FIG. 12, wherein certain components have been removed and not shown to facilitate clarity of illustration.

In the embodiment of FIGS. 10-11 and 14, it can be seen that the TNT device 212 can be interchangeable in position, such that either of the thermal sensors 232 and 252 can measure either of product case temperature and headspace temperature. This way, an operator can install it onto a pallet of cargo in either orientation, and it will operate effectively. However, in other embodiments, as in the example of FIGS. 12-13, it will be appreciated that a TNT device can alternatively have a first thermal sensor positioned and dedicated to measuring product case temperature, and a second thermal sensor positioned and dedicated to measuring headspace temperature. For example, a TNT device 310 is shown in FIGS. 12-13 to have an outer housing formed in a clam shell like arrangement through interaction of a frame 312 with a cover 314. In many ways, as will be appreciated, and for example other than as described below, the structure and function of the TNT device 310 can be similar to that of the TNT device 210.

In one embodiment, the frame 312 and the cover 314 can be attached with screws (e.g., 316), though it will be appreciated that the frame 312 and the cover 314 can additionally or alternatively be attached together with one or more of adhesives, radio frequency welding, gaskets and interlocking mechanical features. In one embodiment, both the frame 312 and the cover 314 can be formed from plastic, through it will be appreciated that, in other embodiments, one or both of them can be formed from any of a variety of other suitable materials. In still further embodiments, it will be appreciated that the outer cover can be formed as a unitary structure, such as for example a single molded piece of plastic. The TNT device 310 and its outer housing is shown to generally have the shape of a knob, though it will be appreciated that a TNT device can have any of a variety of other suitable shapes.

As will be appreciated, the frame 312 can cooperate with the cover 314 to define an internal cavity. In one embodiment, one or more circuit boards, sensors, power supplies (e.g., batteries), and antennas can reside at least partially within the internal cavity. In the example of FIGS. 12-13, a circuit board 330 and an antenna 336 can reside within a portion of the internal cavity. A first thermal sensor can be attached to the circuit board 330 adjacent to an aperture 323 in the frame 312, and can be configured to contact, be adjacent to, or be near a surface (e.g., a corrugated paper or plastic surface) of a product case or carton. A second thermal sensor can be attached to the circuit board 330 adjacent to an aperture 321 in the frame 314, and can be configured to contact, be adjacent to, or receive ambient air such as in the headroom of a container. In one embodiment, a conductor (e.g., a copper wire, not shown) can be associated with a thermal sensor to facilitate its thermal interaction with a location external of the TNT device 310. In one embodiment, some or all of the remaining space within the internal cavity can be filled with foam or other material intended to provide temperature insulation surrounding each of the thermal sensors and, if present, conductors. If one or more conductors are present, it will be appreciated that it or they can extend outwardly from the outer housing, in a manner such as described above with respect to the TNT device 210. It will be appreciated that the thermal sensors can be sufficiently spaced from one another such that measurement of the ambient air temperature is not meaningfully affected by temperature of the cargo, and such that measurement of the temperature of the cargo is not meaningfully affected by temperature of the ambient air. In use, the TNT device 310 can be set atop cargo, such as an uppermost carton on a pallet, with the frame 312 being generally horizontal and contacting a surface (e.g., a corrugated surface) or the carton, and being held in position with plastic wrap or otherwise. However, alternatively, the TNT device 310 can be held against (e.g., with plastic wrap) a side surface (e.g., a corrugated surface) of cargo, such as a side wall of a carton on a pallet, with the frame 312 being generally vertical. Regardless of configuration of the TNT device (e.g., 210, 310) and whether horizontally or vertically oriented, it will be appreciated that in some embodiments, certain benefits in operating the TPA tool can be achieved with the TNT device being positioned near the top of a pallet of cargo, versus lower, in order that the TNT device can monitor warmer ambient air that has risen toward the top of an associated container.

In various embodiments, TPA can provide, for example, optimization data for shipments of sensitive and perishable goods. Embodiments of TPA can be implemented in cloud computing environments. "Cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). TPA can include operational planning of shipments, including shipments susceptible to environmental conditions such as temperature. TPA can use algorithms that ingest data sources such as historical route data, weather data, traffic data, and economic data to provide recommendations on shipping methods to optimize parameters such as shipment routes, parameters, delivery timing, and cost. In certain embodiments, algorithms of TPA can additionally or alternatively ingest real-time data to enable continuous modification of forecasts and updates thereof based upon actual measured data received by TPA through real-time data channels. Such real-time data channels can be provided through wireless communication channels such as from seal assemblies (e.g., 98) as described herein. Additional real-time data channels can be provided through application programming interfaces (APIs) to various applications, such as weather-related applications or traffic-related applications, from which data can be ingested for processing. TPA can additionally or alternatively include sending of warnings if environmental conditions deviate from acceptable standards prior to arrival of the shipments to the intended destinations. It will be appreciated that use of predictive analytics in this manner can facilitate cost effective and acceptable environmental conditions (e.g., suitable temperature and/or lack of excessive vibration) during transportation of cargo.

For example, many organizations producing temperature sensitive products default to refrigerated equipment even when it may not be necessary, resulting in need for payment of a cost premium, e.g., 15% to 20%. TPA tools as described herein can help logistics planners take control of the supply chain for temperature sensitive products, such as by allowing logistics planners to make decisions to use refrigerated or non-refrigerated trailers or containers based upon the predicted weather, product attributes and transportation routes, and thereby allowing logistics planners to manage risk and identify opportunities to save shipping costs. In this system, TPA can involve performance and use of physics-based predictions to make actionable decisions about transportation equipment choices.

TPA can involve a physics-based analytical tool that leverages current and/or historic weather predictions and considers thermal effects such as radiation, convection and conduction during transport. TPA tools can be based upon surrogate model analytics that capture complex physics in a mathematical form, thereby reducing required computational time to a few seconds. TPA software can predict thermal behavior of temperature sensitive products, such as fresh food and frozen products, during transportation and in different parts of a trailer or container. TPA tools can aggregate data from a large number of simulations for selected container types, routes and time periods to provide statistical temperature distribution of product for a selected container type, route and time period.

TPA tools can be used for short term planning and cost optimization for transportation equipment requirements. Additionally, TPA tools can provide insights for long term planning to determine equipment requirements for selected lanes. Strategic savings studies based upon time of year and regions of the country/world can also be carried out to test and forecast equipment requirements and cost savings opportunities. In this way, TPA tools as described herein can merge deep engineering technical expertise with sophisticated supply chain expertise, thereby unlocking substantial cost savings, improving quality and increasing customer satisfaction.

While TPA tools can involve predictive analysis as described herein, it will be appreciated that a TPA tool can be particularly effective when coupled with a sensor system for gathering and communicating actual real-time environmental feedback from the cargo. For example, particular benefits can be achieved when a seal assembly as described herein (e.g., 98) is used as part of or in conjunction with a TPA system. In particular, by obtaining real-time feedback of environmental conditions from a seal assembly during shipment of cargo via any suitable network communications, a TPA system can adjust its predictive model in real time during shipment of the cargo in order to account for any deviations from expectations. In one example, the real-time feedback can include temperature information, either inside or outside the shipping container, or both. In another example, the real-time feedback can include vibration information, such as may be indicative of adverse road conditions of adequate severity as potentially to damage cargo. In another example, the real-time feedback can include other environmental information, such as humidity levels or atmospheric pressure levels within the container or cargo package, which may be damaging to certain types of cargo. In still another example, the real-time feedback can include information concerning a measured level of VOCs as measured within the container or cargo package included therein, such as may be indicative of food or other items within the container reaching advanced or overly-advanced stages of ripeness. In yet another example, the real-time feedback can include information concerning a measured level of fuel within a refrigeration unit and/or tractor associated with the container.

In some instances, the TPA system can then effect changes in the manifest or shipping process to prevent damage to the cargo resulting from the deviations (e.g., if the measured temperature is warmer than expected, if the measured vibration exceeds acceptable levels, if the measured VOCs indicate potential advanced spoilage of food products, and/or if measured fuel levels are deemed insufficient), and/or in response to actual or predicted accidents, traffic or other delays along the actual or intended route. Or, in other instances, the TPA system can then effect changes in the manifest or shipping process to allow use of slower or lower cost shipping methods (e.g., if the measured temperature is more moderate than expected, if the measured vibration is less than acceptable levels, and/or if the measured VOCs indicate a slower ripeness of food products). Such changes or modifications to the manifest or shipping process can be conveyed to one or more users through any suitable dashboard, user interface, or online information portal. In some embodiment, a TPA system can provide an online interface specifically configured to display real-time information associated with a particular shipment of cargo, such as real-time temperature readings, real-time positional information, real-time speed data, and real-time route data. The online interface can provide visualizations of various information associated with the shipment (as collected and transmitted by the seal assembly 98, for example), such as product temperature readings over time or headspace temperature readings over time.

Benefits of TPA, alone or in combination with real-time feedback (such as provided by the seal assembly 98) include, for example, greater visibility to logistics managers, presentation of cost savings opportunities, reduction of risk to temperature sensitive products during transportation, increase in transportation alternatives and resultant smoothening of market volatility, and opportunities to leverage predictive analytics to save transportation cost for products with seasonal temperature requirements.

In one embodiment, a method and system in accordance with the present disclosure can involve use of a seal assembly (e.g., 98) in conjunction with a constricted passageway, such as a narrow waterway (e.g., the Panama Canal). In one embodiment, a private communication system can be established adjacent to a constricted passageway, and configured for interaction with seal assemblies provided upon containers passing through the constricted passageway. In another embodiment, a method and system in accordance with the present disclosure can involve use of a seal assembly (e.g., 98) in conjunction with a private communication system present on a transoceanic cargo ship. In either embodiment, the private communication system can comprise one or more 3G, 4G, 5G, cellular or other communication towers, WiFi hub(s), Starlink or other satellite interface, for example. While the Panama Canal is a suitable example of a constricted passageway, other examples can include a customs checkpoint, a train depot, a highway, or the like. While each of the seal assemblies can be configured to communicate directly with the private communication system, in other embodiments the seal assemblies can facilitate a mesh network among themselves (e.g., communicating through LoRa or other suitable protocol). In this latter configuration, one or more of the seal assemblies can communicate directly with the private communication system, while others of the seal assemblies communicate indirectly with the private communication system through the mesh network involving others of the seal assemblies. In this way, seal assemblies on containers buried deeply within a vessel, for example, can communicate effectively with the private communication system, even though they are unable to directly do so due to their position or other circumstances. By providing monitoring near a constricted passageway, it will be appreciated that all of the seal assemblies passing through the constricted passageway can be detected and accounted for at that time, thus effectively serving as a checkpoint for all of the monitored cargo. Such a checkpoint can be particularly beneficial when communications systems are not readily available either before or after the checkpoint (e.g., within vast bodies of water on both sides of the Panama Canal). While a private communication system has been discussed, it will be appreciated that an existing or public communication systems (e.g., 3G, 4G, 5G, WiFi, or Starlink) can alternatively be effectively employed to facilitate this described functionality near or at a constricted passageway.

The foregoing description of embodiments and examples of the disclosure has been presented for purposes of illustration and description. It is not intended to be exhaustive or to limit the disclosure to the forms described. Numerous modifications are possible in light of the above teachings. Some of those modifications have been discussed and others will be understood by those skilled in the art. The embodiments were chosen and described in order to best illustrate the principles of the disclosure and various embodiments as are suited to the particular use contemplated. The scope of the disclosure is, of course, not limited to the examples or embodiments set forth herein, but can be employed in any number of applications and equivalent devices by those of ordinary skill in the art. Rather it is hereby intended the scope of the invention be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A locking assembly comprising:
   a carrier defining an internal compartment;
   an elongated cable comprising a core and a cover, the cover coaxially surrounding the core, the elongated cable extending from a proximal end to a distal end, the proximal end being disposed within the internal compartment, and a portion of the elongated cable extending outside of the internal compartment;
   a body disposed within the internal compartment, the body defining a proximal passage and a distal passage;
   a proximal end ferrule attached to the core adjacent to the proximal end;
   a distal end ferrule attached to the core adjacent to the distal end;
   a spring abutting the body adjacent to the proximal passage; and
   a magnet configured to produce a magnetic field; wherein
   a portion of the core adjacent to the proximal end extends sequentially through the proximal passage, through the spring and into the proximal end ferrule;
   the magnet is configured to move in response to the elongated cable being cut; and
   the carrier is formed of a non-ferrous material such that a position of the magnetic field can be detected from outside of the carrier.

2. The locking assembly of claim 1 wherein the cover adjacent to the proximal end of the elongated cable abuts the body adjacent to the proximal passage.

3. The locking assembly of claim 1 wherein:
   the proximal end is restrained by the body;
   the distal end is movable from an unlocked position to a locked position;
   in the unlocked position, the distal end is spaced from the body; and
   in the locked position, the distal end is restrained by the body.

4. The locking assembly of claim 1 wherein prior to the elongated cable being cut, the spring simultaneously maintains tension on the core and compression on the cover, each opposing one another along a longitudinal length of the elongated cable.

5. The locking assembly of claim 1 wherein prior to the elongated cable being cut, the proximal end ferrule abuts the spring adjacent to the proximal end of the elongated cable, and the distal end ferrule abuts the cover adjacent to the distal end of the elongated cable.

6. The locking assembly of claim 1 wherein:
   the cover comprises a textured outer surface;
   the body comprises at least one detent associated with the distal passage and configured to engage the textured outer surface of the cover such that the distal end of the elongated cable is restrained from being removed from the distal passage in a reverse direction after having been inserted into the distal passage in a forward direction.

7. The locking assembly of claim 1 wherein:
   the body is formed from metal; and
   the carrier is formed from plastic.

8. The locking assembly of claim 1 further comprising a cam, wherein:
   the cam is disposed within the internal compartment;

the cam is configured to move from a first position to a second position upon cutting of the elongated cable;

the cam comprises the magnet and an engagement face; and the engagement face contacts the proximal end ferrule.

9. The locking assembly of claim 8 further comprising a striker, wherein:

the striker is coupled with the cam and configured to move from an extended position to a retracted position, with the extended position of the striker corresponding with the first position of the cam, and the retracted position of the striker corresponding with the second position of the cam.

10. The locking assembly of claim 1, wherein:

in the unlocked position, the distal end of the elongated cable is configured for routing through an opening in a hasp associated with a door of a container;

in the locked position, the elongated cable cooperates to define a loop, with the loop capturing the hasp thereby locking the door of the container; and upon arrival of the container at a destination, the elongated cable is configured to be cut thereby facilitating its removal from the hasp and opening of the door of the container.

11. The locking assembly of claim 1 being configured for one-time use.

12. A gateway comprising:

a power supply;

a radio communication device;

a first magnetic detector;

a second magnetic detector;

an outer housing defining an exterior channel; and a processor electrically coupled with each of the power supply, the radio communication device, the first magnetic detector and the second magnetic detector;

wherein the processor is configured to operate the radio communication device to transmit a first signal upon determination, by the processor, and based upon signals from the first magnetic detector and the second magnetic detector, if a locking assembly is intact and interlocked within the exterior channel.

13. The gateway of claim 12 wherein:

the outer housing is formed from plastic and further defines an interior chamber;

each of the power supply, the radio communication device, the first magnetic detector, the second magnetic detector sensor, and the processor are disposed within the interior chamber.

14. The gateway of claim 13 wherein:

the outer housing comprises a bottom wall and a side wall structure which cooperate to at least partially define the exterior channel, the bottom wall defining an inner bearing surface; and the side wall structure comprises a riser portion and a ledge portion, the riser portion generally forming a horseshoe shape with a first end of the riser portion adjacent to the inner bearing surface and extending longitudinally to a second end of the riser portion from which the ledge portion extends, the ledge portion defining an outer bearing surface.

15. The gateway of claim 14 wherein the exterior channel is configured to slidably receive a locking assembly while providing:

lateral constraint with respective portions of the riser portion; and longitudinal constraint with the inner bearing surface and the outer bearing surface.

16. The gateway of claim 12 being configured for repeatable use with a succession of respective locking assemblies.

17. The gateway of claim 12 wherein:

the processor is configured to operate the radio communication device to communicate with cargo stored within a container and to receive environmental data concerning an environmental condition; and the processor is configured to operate the radio communication device to transmit a second signal relating to the environmental data.

18. The gateway of claim 12 further comprising a detector electrically coupled with the processor and configured to monitor an environmental condition, wherein the processor is configured to operate the radio communication device to transmit a second signal, the second signal relating to the environmental condition.

19. The gateway of claim 12 further comprising a location detector electrically coupled with the processor and configured to identify a geographic location of the gateway, wherein the processor is configured to operate the radio communication device to transmit a second signal, wherein the second signal relates to the geographic location.

* * * * *